United States Patent
Davidson et al.

(10) Patent No.: US 8,820,083 B2
(45) Date of Patent: Sep. 2, 2014

(54) THERMODYNAMIC CYCLE WITH COMPRESSOR RECUPERATION, AND ASSOCIATED SYSTEMS AND METHODS

(71) Applicant: SuperCritical Technologies, Inc., Bremerton, WA (US)

(72) Inventors: Chal S. Davidson, Bremerton, WA (US); Steven A. Wright, Albuquerque, NM (US); Robert L. Fuller, Arvada, CO (US)

(73) Assignee: SuperCritical Technologies, Inc., Bremerton, WA (US)

(*) Notice: Subject to any disclaimer, the term of this patent is extended or adjusted under 35 U.S.C. 154(b) by 0 days.

(21) Appl. No.: 13/843,517

(22) Filed: Mar. 15, 2013

(65) Prior Publication Data

US 2014/0084595 A1    Mar. 27, 2014

Related U.S. Application Data

(60) Provisional application No. 61/744,439, filed on Sep. 26, 2012.

(51) Int. Cl.
| | |
|---|---|
| F01K 25/00 | (2006.01) |
| F01K 25/08 | (2006.01) |
| G05F 1/66 | (2006.01) |
| F24H 9/00 | (2006.01) |
| H02K 7/18 | (2006.01) |
| F01K 7/32 | (2006.01) |

(52) U.S. Cl.
CPC ... *F01K 7/32* (2013.01); *G05F 1/66* (2013.01); *F24H 9/0005* (2013.01); *H02K 7/18* (2013.01)

USPC .............................................. 60/671; 60/682

(58) Field of Classification Search
USPC ............ 60/650, 659, 676, 682–684, 651, 671
See application file for complete search history.

(56) References Cited

U.S. PATENT DOCUMENTS

| | | | |
|---|---|---|---|
| 4,498,289 A | 2/1985 | Osgerby | |
| 4,765,143 A * | 8/1988 | Crawford et al. | ............... 60/671 |
| 6,470,683 B1 | 10/2002 | Childs et al. | |
| 6,581,384 B1 | 6/2003 | Benson | |
| 7,313,926 B2 * | 1/2008 | Gurin | .......................... 62/324.2 |
| 7,900,450 B2 | 3/2011 | Gurin | |
| 8,015,812 B1 | 9/2011 | Kesseli et al. | |

(Continued)

FOREIGN PATENT DOCUMENTS

| | | |
|---|---|---|
| WO | WO-2007131281 A1 | 11/2007 |
| WO | WO-2012049259 A1 | 4/2012 |

OTHER PUBLICATIONS

Angelino, "Carbon Dioxide Condensation Cycles for Power Production," Contributed by the Gas Turbine Division for presentation at the Gas Turbine Conference, Washington D. C., Mar. 17-21, 1968, of The American Society of Mechanical Engineers, Manuscript retrieved at ASME Headquarters, Dec. 28, 1967, Paper No. 68-CT-23, 9 pages.

(Continued)

*Primary Examiner* — Hoang Nguyen
(74) *Attorney, Agent, or Firm* — Robert R. Richardson

(57) ABSTRACT

Disclosed illustrative embodiments include modular power infrastructure networks, distributed electrical power infrastructure networks, methods for operating a modular power infrastructure network, and methods for fabricating a modular power infrastructure network.

37 Claims, 17 Drawing Sheets

(56) References Cited

U.S. PATENT DOCUMENTS

| | | | |
|---|---|---|---|
| 8,096,128 B2 | 1/2012 | Held et al. | |
| 8,099,198 B2 | 1/2012 | Gurin | |
| 8,132,412 B2 * | 3/2012 | Bennett | 60/650 |
| 8,166,761 B2 | 5/2012 | Moghtaderi et al. | |
| 8,397,506 B1 | 3/2013 | Wright et al. | |
| 2004/0244376 A1 | 12/2004 | Litwin et al. | |
| 2010/0024421 A1 | 2/2010 | Litwin et al. | |
| 2010/0287934 A1 | 11/2010 | Glynn et al. | |
| 2011/0061384 A1 | 3/2011 | Held et al. | |
| 2012/0017597 A1 | 1/2012 | Freund et al. | |
| 2012/0047892 A1 | 3/2012 | Held et al. | |
| 2012/0067055 A1 | 3/2012 | Held | |
| 2012/0102996 A1 | 5/2012 | Freund | |
| 2012/0128463 A1 * | 5/2012 | Held | 415/1 |
| 2012/0131921 A1 | 5/2012 | Held | |
| 2013/0033044 A1 | 2/2013 | Wright et al. | |

OTHER PUBLICATIONS

Angelino, "Perspectives for the Liquid Phase Compression Gas Turbine," Contributed by the Gas Turbine Conference and Products Show, Zurich, Switzerland, Mar. 13-17, 1966, of The American Society of Mechanical Engineers, Manuscript received at ASME Headquarters, Dec. 15, 1965, Paper No. 66-CT-111, 10 pages.

Angelino, "Real Gas Effects in Carbon Dioxide Cycles," Contributed by the Gas Turbine Division of The American Society of Mechanical Engineers for presentation at the International Gas Turbine Conference & Products Show, Cleveland, Ohio, Mar. 10-13, 1969, 12 pages.

Conboy, et al., "Performance Characteristics of an Operating Supercritical CO2 Brayton Cycle," Draft, Proceedings of the ASME Turbo Expo 2012, Jun. 11-15, 2012, Copenhagen, Denmark, 12 pages.

Dostal, et al., "A Supercritical Carbon Dioxide Cycle for Next Generation Nuclear Reactors," Advanced Nuclear Power Technology Program, MIT-ANP-TR-100, Mar. 10, 2004, 160 pages, 1 of 2.

Dostal, et al., "A Supercritical Carbon Dioxide Cycle for Next Generation Nuclear Reactors," Advanced Nuclear Power Technology Program, MIT-ANP-TR-100, Mar. 10, 2004, 165 pages, 2 of 2.

International Search Report and Written Opinion for PCT/US2013/060199 Mailed Dec. 13, 2013, 10 pages.

Muto, et al., "Optimal Cycle Scheme of Direct Cycle Supercritical CO2 Gas Turbine for Nuclear Power Generation Systems," International Conference on Power Engineering 2007, Oct. 23-27, 2007, Hangzhou, China, 7 pages.

* cited by examiner

US 8,820,083 B2

THERMODYNAMIC CYCLE WITH COMPRESSOR RECUPERATION, AND ASSOCIATED SYSTEMS AND METHODS

CROSS-REFERENCE TO RELATED APPLICATION

The present application claims priority to U.S. Provisional Application 61/744,439, filed Sep. 26, 2012, entitled "MODULAR POWER INFRASTRUCTURE," and incorporated herein by reference. To the extent the foregoing application and/or any other references incorporated herein by reference conflict with the present disclosure, the present disclosure controls.

BACKGROUND

The present application is related to working fluids and their use in thermodynamic cycles.

SUMMARY

Disclosed illustrative embodiments include modular power infrastructure networks, distributed electrical power infrastructure networks, methods for operating a modular power infrastructure network, and methods for fabricating a modular power infrastructure network.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
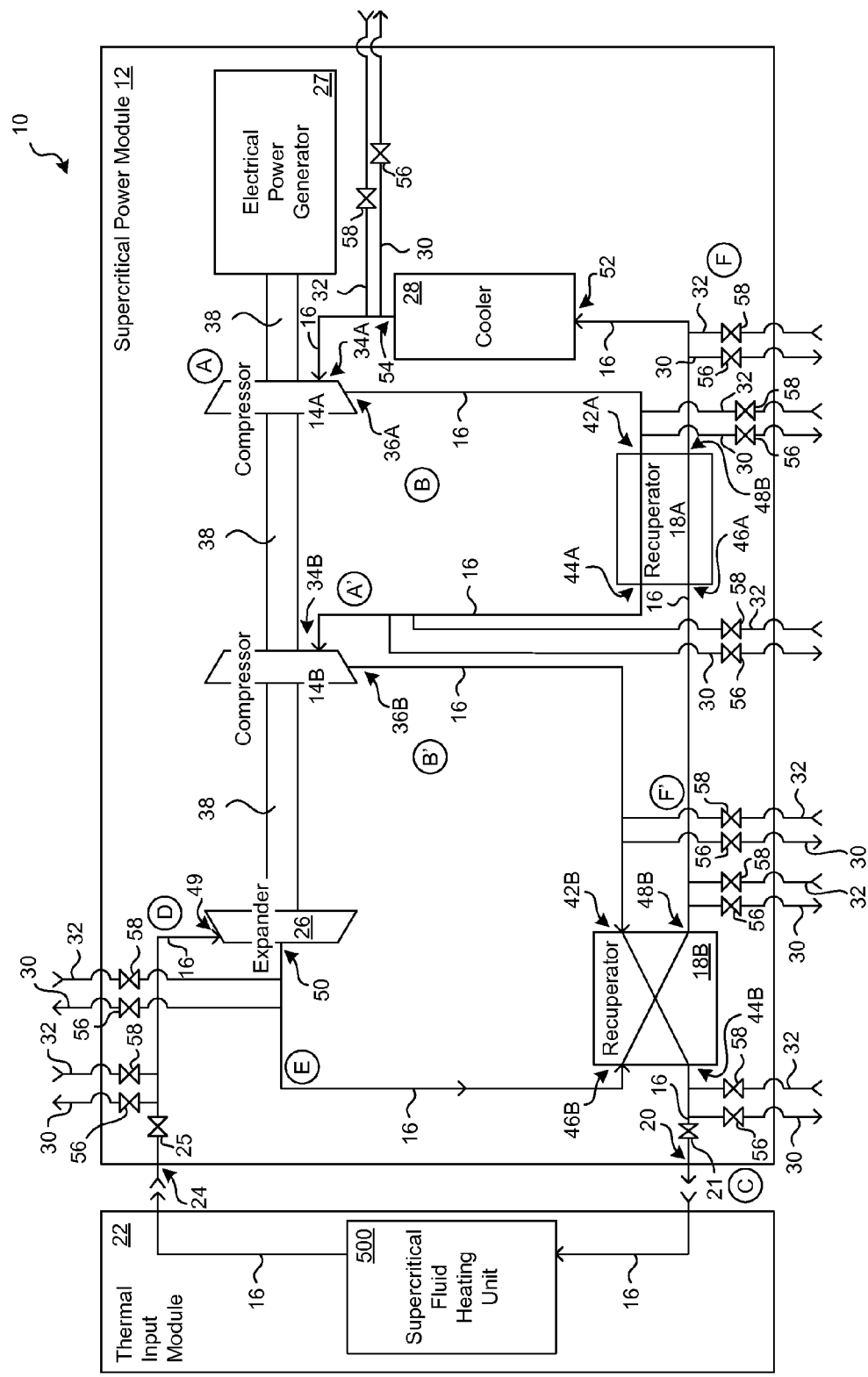
FIG. 1 is a schematic illustration of an illustrative embodiment of a modular power infrastructure network.

In the following detailed description, reference is made to the accompanying drawings, which form a part hereof. In the drawings, similar symbols typically identify similar components, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Many embodiments of the technology described below may take the form of computer-executable instructions, including routines executed by a programmable computer. Those skilled in the relevant art will appreciate that the technology can be practiced on computer systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. In particular embodiments, data structures and transmissions of data particular to aspects of the technology are also encompassed within the scope of the technology.

Overview

Given by way of overview, disclosed illustrative embodiments include modular power infrastructure networks, distributed electrical power infrastructure networks, methods for operating a modular power infrastructure network, and methods for fabricating a modular power infrastructure network. The illustrative embodiments disclosed herein suitably incorporate a thermodynamic cycle with compressor recuperation.

Referring briefly to FIG. 1, in an illustrative embodiment given by way of non-limiting example, an illustrative modular power infrastructure network 10 includes a supercritical power module 12 that operates according to a thermodynamic cycle having compressor recuperation. The supercritical power module 12 includes a compressor 14A structured to compress a supercritical fluid 16. A recuperator 18A is structured to heat compressed supercritical fluid 16 from the compressor 14A. A compressor 14B is structured to compress heated supercritical fluid 16 received from the recuperator 18A. A recuperator 18B is structured to heat compressed supercritical fluid 16 from the compressor 14B. An outlet path 20 is structured to provide heated compressed supercritical fluid 16 from the recuperator 18B to a heat source, such as a thermal input module 22. An inlet path 24 is structured to provide heated compressed supercritical fluid 16 from the heat source, such as the thermal input module 22. An expander 26 is coupled to receive heated compressed supercritical fluid 16 from the heat source 22 and is structured to convert a drop in enthalpy of the supercritical fluid 16 to mechanical energy. A cooler 28 is structured to cool expanded supercritical fluid 16 from the recuperator 18A and provide cooled supercritical fluid 16 to the compressor 14A.

Continuing by way of overview, in various embodiments the supercritical power module suitably is disposed within a modular, containerized platform (not shown in FIG. 1). Also, if desired, various embodiments of the modular power infrastructure network may also include, in addition to the supercritical power module 12, one or more other modules (not shown in FIG. 1) that may be supplied with supercritical fluid 16 from the supercritical power module 12 and connectable with various modules within the modular power infrastructure network to help address various issues, such as without limitation various fueling options, different operating environments, heating and cooling needs, mechanical work requirements, siting constraints, and/or efficiency needs, as desired for a particular application. Illustrative embodiments of modular power infrastructure networks, including the supercritical power module and the other modules that make up various embodiments of the modular power infrastructure network, will be discussed below by way of non-limiting examples.

In at least some embodiments, the supercritical power module 12 and the thermal input module 22 may be provided as separate modules; that is, the supercritical power module 12 and the thermal input module 22 each may be provided in its own housing, enclosure or the like. In such embodiments, supercritical fluid 16 may exit the supercritical power module 12 and enter the thermal input module 22, be heated by the thermal input module 22, and then exit the thermal input module and enter the supercritical power module 12.

In other embodiments, the supercritical power module 12 and the thermal input module 22 need not be provided as separate modules. To that end, in some embodiments the supercritical power module 12 and the thermal input module 22 may be provided together in one housing, enclosure, or the like. In some such embodiments, the one housing, enclosure, or the like may be considered a "module" (as discussed below). However, the one housing, enclosure, or the like need not be a "module." To that end, in some other such embodiments the one housing, enclosure, or the like may not be considered a "module."

As discussed above, the present application is related to working fluids and their use in thermodynamic cycles with compressor recuperation. In various embodiments, such thermodynamic cycles may include a Brayton cycle, a Rankine cycle, or the like. The Brayton thermodynamic cycles and the Rankine thermodynamic cycles are generally characterized by pressurization of a working fluid such as by compression and/or pumping, heat addition to the working fluid, expansion of the heated and pressurized fluid in a device for converting kinetic, thermal, or potential energy of the working fluid to mechanical energy, and then rejection of energy from the working fluid. In a closed system, after expansion the working fluid is re-pressurized, and the working fluid undergoes the above process in a cyclical manner.

As is known, working fluids may be capable of transitioning to a supercritical state at one or more points of the thermodynamic cycle process. In addition, the working fluid may be entirely within a supercritical state at every point of the thermodynamic cycle. As is also known, a supercritical state is defined as a state of temperature and pressure above the critical point of the fluid. When in the supercritical state, the fluids are capable of transitioning to higher pressure with small amounts of change in entropy, relative to pressurization of the fluid in its ideal state. The compressibility of supercritical fluids allows for a reduced number of compression stages relative to similar compression of a fluid in the gaseous state. Supercritical fluids also exhibit reduced viscosity and surface tension relative to their fluid states. The combination of these features allows supercritical working fluids to exhibit high rates of mass flow in rotating machinery, thereby reducing required areal size of the rotating machinery to achieve a given amount of work output.

Any one or more of several supercritical fluids, such as Xe, Kr, $CO_2$, and/or He, may be used in various embodiments. These supercritical fluids may be in the form of mixtures as well as in a pure form. These supercritical fluids may also be mixed with any suitable number of organic gases or gaseous impurities. For sake of brevity, this discussion will generally relate to use of $CO_2$ in the supercritical state (sometimes referred to as "$sCO_2$"); however, it will be understood that similar principles apply to the other above-mentioned supercritical fluids or mixtures thereof. To that end, any one or more of the above-mentioned supercritical fluids may be used as desired for a particular application. For example, considerations for use of any particular supercritical fluid may include choice of operating temperature or pressure of a desired thermomechanical energy conversion system. Accordingly, limitation to any particular supercritical fluid is not intended and is not to be inferred.

Compressor Recuperation

As discussed above, the supercritical power module 12 operates according to a thermodynamic cycle (such as without limitation a Brayton cycle) with compressor recuperation (as will be explained below with reference to FIG. 2). Briefly, in various embodiments the recuperator 18A transfers heat remaining in expanded (lower pressure) supercritical fluid 16 exiting the recuperator 18B to higher pressure supercritical fluid 16 entering the compressor 14B. Also, the recuperator 18B transfers heat from the expanded supercritical fluid 16 to the supercritical fluid 16 exiting the compressor 14B. Thus, the temperature of the expanded supercritical fluid 16 that exits the recuperator 18B is lowered (relative to simple recuperation) and the temperature of compressed supercritical fluid 16 that enters the recuperator 18B is raised. Relative to simple recuperation, these illustrative embodiments may help result in a lower average heat rejection temperature and greater amounts of recuperated heat, which can help increase the average heat addition temperature compared to a simple recuperated power cycle.

Referring back to FIG. 1, in an embodiment the illustrative modular power infrastructure network 10 includes the supercritical power module 12 that operates according to a thermodynamic cycle having compressor recuperation. When connected to a source of thermal energy, the supercritical power module 12 can convert a drop in enthalpy of the supercritical fluid 16 to mechanical energy. If desired, in some embodiments the supercritical power module 12 may supply supercritical fluid 16 to any other suitable modules that may be coupled to receive supercritical fluid 16 from the supercritical power module 12.

In the embodiment shown in FIG. 1 and as will be explained below with details given by way of illustration and not limitation, the supercritical power module 12 suitably includes the compressor 14A, the recuperator 18A, the compressor 14B, the recuperator 18B, the outlet path 20, the inlet path 24, the expander 26, and the cooler 28. As will also be explained below, in some embodiments the supercritical power module 12 may include at least one electrical power generator 27 and in some embodiments the supercritical power module 12 may include at least one supercritical fluid supply path 30 and at least one supercritical fluid return path 32.

The compressor 14A is structured to compress, that is raise the pressure of, the supercritical fluid 16. The compressor 14A has an inlet 34A and an outlet 36A. In various embodiments, the compressor 14A suitably may be implemented as any suitable device, such as a compressor or a pump or the like, that raises the pressure of the supercritical fluid 16. In some embodiments, the compressor 14A is operatively coupled to the expander 26 with a shaft 38. In such embodiments, the expander 26 converts a drop in enthalpy of the supercritical fluid 16 to mechanical energy that includes rotation of the shaft 38, thereby rotating the compressor 14A. It will be appreciated that operatively coupling of the compressor 14A to the expander 26 may be made via a mechanical coupling (such as a gearbox or the like) or, if desired, a magnetic coupling.

The recuperator 18A is structured to heat the compressed supercritical fluid 16 that exits the outlet 36A of the compressor 14A. The recuperator 18A suitably is any type of heat exchanger, such as a tube-and-shell heat exchanger, a printed circuit heat exchanger, or the like. The heat exchanger of the recuperator 18A may be implemented using any suitable flow orientation as desired, such as a cross-flow orientation, a counter-flow orientation, or a parallel-flow orientation. The recuperator 18A suitably is sized to have a selected heat transfer capacity as desired for a particular application. In the embodiment shown in FIG. 1, the recuperator 18A is in fluid communication with the outlet 36A of the compressor 14A. The recuperator 18A includes an inlet 42A, coupled in fluid communication with the outlet 36A of the compressor 14A, and an outlet 44A that define one side of the heat exchanger of the recuperator 18A. The recuperator 18A also includes an inlet 46A, coupled in fluid communication with the recuperator 18B to receive expanded supercritical fluid 16, and an outlet 48A that define another side of the heat exchanger of the recuperator 18A. Heat is transferred to compressed supercritical fluid 16 flowing between the inlet 42A and the outlet 44A on one side of the heat exchanger from expanded supercritical fluid 16 flowing between the inlet 46A and the outlet 48A on the other side of the heat exchanger.

The compressor 14B is structured to compress, that is raise the pressure of, the supercritical fluid 16 that exits the outlet 44A of the recuperator 18A. Provision of the compressors 14A and 14B can be considered to be equivalent to provision of two compressor stages, each with a smaller pressure ratio than that of a single compressor for a simple recuperated power cycle. The product of pressure ratios of the two compressor stages (that is, pressure ratios for the compressors 14A and 14B) may generally approximate a compressor pressure ratio for a single compressor for a simple recuperated power cycle. Nevertheless, with working fluids that are very dense and have little compressibility, increase in compression power in the second compressor stage (such as, in various embodiments, the compressor 14B) is offset by increased power cycle efficiency caused by lower heat rejection temperature and greater amounts of recuperation that result in a higher heat addition temperature. As a result, some embodiments can help achieve an efficiency increase on the order of around two percent or so above that of a simple recuperated power cycle for typical operating conditions used in typical supercritical fluid power systems.

The compressor 14B has an inlet 34B coupled in fluid communication with the outlet 44A of the recuperator 18A. The compressor 14B has an outlet 36B. In various embodiments, the compressor 14B suitably may be implemented as any suitable device, such as a compressor or a pump or the like, that raises the pressure of the supercritical fluid 16, and may be similar to or the same as the compressor 14A. In some embodiments, the compressor 14B is operatively coupled to the expander 26 with a shaft 38 for rotation thereby in a similar or same manner as described above for the compressor 14A.

Thus, the compressors 14A and 14B operate in series (as opposed to operating in parallel). Because the compressors 14A and 14B operate in series (as opposed to operating in parallel), it will be appreciated that potential control issues that may be applicable to interaction of compressor stages operating in parallel may not be applicable to the compressors 14A and 14B that operate in series.

The recuperator 18B is structured to heat the compressed supercritical fluid 16 that exits the outlet 36B of the compressor 14B. The recuperator 18B suitably is any type of heat exchanger, such as a tube-and-shell heat exchanger, a printed circuit heat exchanger, or the like, and may be similar to or the same as the recuperator 18A. Likewise, the heat exchanger of the recuperator 18B may be implemented using any suitable flow orientation as desired, such as a cross-flow orientation, a counter-flow orientation, or a parallel-flow orientation and may be similar to or the same as the recuperator 18A. The recuperator 18B suitably is sized to have a selected heat transfer capacity as desired for a particular application. In the embodiment shown in FIG. 1, the recuperator 18B is in fluid communication with the outlet 36B of the compressor 14B. The recuperator 18B includes an inlet 42B, coupled in fluid communication with the outlet 36A of the compressor 14A, and an outlet 44B that define one side of the heat exchanger of the recuperator 18B. The recuperator 18B also includes an inlet 46B, coupled in fluid communication with the expander 26 to receive expanded supercritical fluid 16, and an outlet 48B, coupled in fluid communication with the inlet 46A of the recuperator 18A, that define another side of the heat exchanger of the recuperator 18B. Heat is transferred to compressed supercritical fluid 16 flowing between the inlet 42B and the outlet 44B on one side of the heat exchanger from expanded supercritical fluid 16 flowing between the inlet 46B and the outlet 48B on the other side of the heat exchanger.

The outlet path 20 is structured to provide heated compressed supercritical fluid 16 from the recuperator 18B to a heat source, such as a thermal input module 22. The outlet path 20 includes a suitable isolation valve 21. The heat source, such as the thermal input module 22, suitably heats supercritical fluid provided thereto from the outlet path 20. The inlet path 24 is structured to provide heated compressed supercritical fluid 16 from the heat source 22. The inlet path 24 includes a suitable isolation valve 25. It will be appreciated that the thermal input module 22 is considered to be a module that is outside the module boundary of the supercritical power module 12. As such, embodiments of the thermal input module 22 will be described below along with other modules that may be included as desired in embodiments of modular power infrastructure networks.

The expander 26 is coupled to receive heated compressed supercritical fluid 16 from the heat source, such as the thermal input module 22, and is structured to convert a drop in enthalpy of the supercritical fluid 16 to mechanical energy, such as without limitation rotation of the shaft 38. The expander 26 suitably may include any suitable device capable of expanding the heat supercritical fluid 16 received from the inlet path 24 and converting a drop in enthalpy of the supercritical fluid 16 to mechanical energy. As such, in some embodiments the expander 26 suitably may include without limitation a turbine or turbomachinery, such as without limitation a turbo-expander, an expansion turbine, a centrifugal turbine, an axial flow turbine, and/or the like. In such embodiments, the expander 26 causes the shaft 38 to rotate at very high rotational velocities, such as without limitation rotational velocities much greater than 36,000 revolutions per minute. In some other embodiments, the expander 26 suitably may also include a reciprocating engine. It will be appreciated that, in some embodiments, more than one expander 26 may be provided, as desired for a particular application.

As shown in the embodiment of FIG. 1, the expander 26 has an inlet 49 operatively coupled in fluid communication with the inlet path 24 and an outlet 50 operatively coupled in fluid communication with the inlet 46B of the recuperator 18B to transfer heat from expanded supercritical fluid 16 to compressed supercritical fluid 16 that exits the compressor 14B.

In some embodiments at least one electrical power generator 27 may be operationally coupled to the expander 26 with the shaft 38. The electrical power generator 27 may be any suitable electrical power generator known in the art, such as a turbogenerator, an alternator, or any other suitable electrical power generator known in the art. The electrical power generator 27 may be sized to have an electrical power generating capacity as desired for a particular application. Also, it will be appreciated that, in some embodiments, more than one electrical power generator 27 may be provided, as desired for a particular application. Given by way of non-limiting example, depending on the particular application, in some embodiments the electrical power generator 27 (or all of the electrical power generators 27) may have a rating in a range between 2-6 KW$_e$. In some embodiments and given by way of non-limiting example, the electrical power generator 27 (or all of the electrical power generators 27) may have a rating on the order of around 5 KW$_e$ or so, as desired for a particular application. It will be appreciated that no limitation regarding rating of the electrical power generator 27 (or cumulative rating of all of the electrical power generators 27) is intended and is not to be inferred.

The cooler 28 is structured to cool expanded supercritical fluid 16 from the recuperator 18A and provide cooled supercritical fluid 16 to the compressor 14A. The cooler 28 has an inlet 52 that is operatively coupled in fluid communication to the outlet 48A of the recuperator 18A and an outlet 54 that is operatively coupled in fluid communication to the inlet 34 of the compressor 14A. The cooler 28 may be any suitable cooler that is suitable for cooling the supercritical fluid 16. For example and given by way of illustration and not of limitation, in various embodiments the cooler 28 may include: a "wet" cooler, such as a condenser; a heat exchanger like a tube-and-shell heat exchanger or a printed circuit heat exchanger; or a "dry" cooler, such as a forced-air cooling "radiator" or the like.

It will be appreciated that, as discussed above, operating parameters may be selected as desired for a particular application. Given by way of illustration and not of limitation, illustrative operating parameters for various illustrative components of and embodiments of the supercritical power module 10 may include, without limitation, parameters on the order of values as follows, as desired for a particular application: inlet temperature on the order of around 305 K or so for the compressors 14A and 14B; inlet pressure on the order of around 7.5 MPa or so for the compressors 14A and 14B; mass flow rate on the order of around 45 kg/s or so; system pressure drop on the order of around 5% or so; cold side recuperator approach temperature on the order of around 15 K or so; and (nearly)-isentropic efficiencies on the order of around 82 percent or so for the compressor 18B, on the order of around 84 percent or so for the compressor 14A, and on the order of around 85 percent or so for the expander 26.

Figure 2:
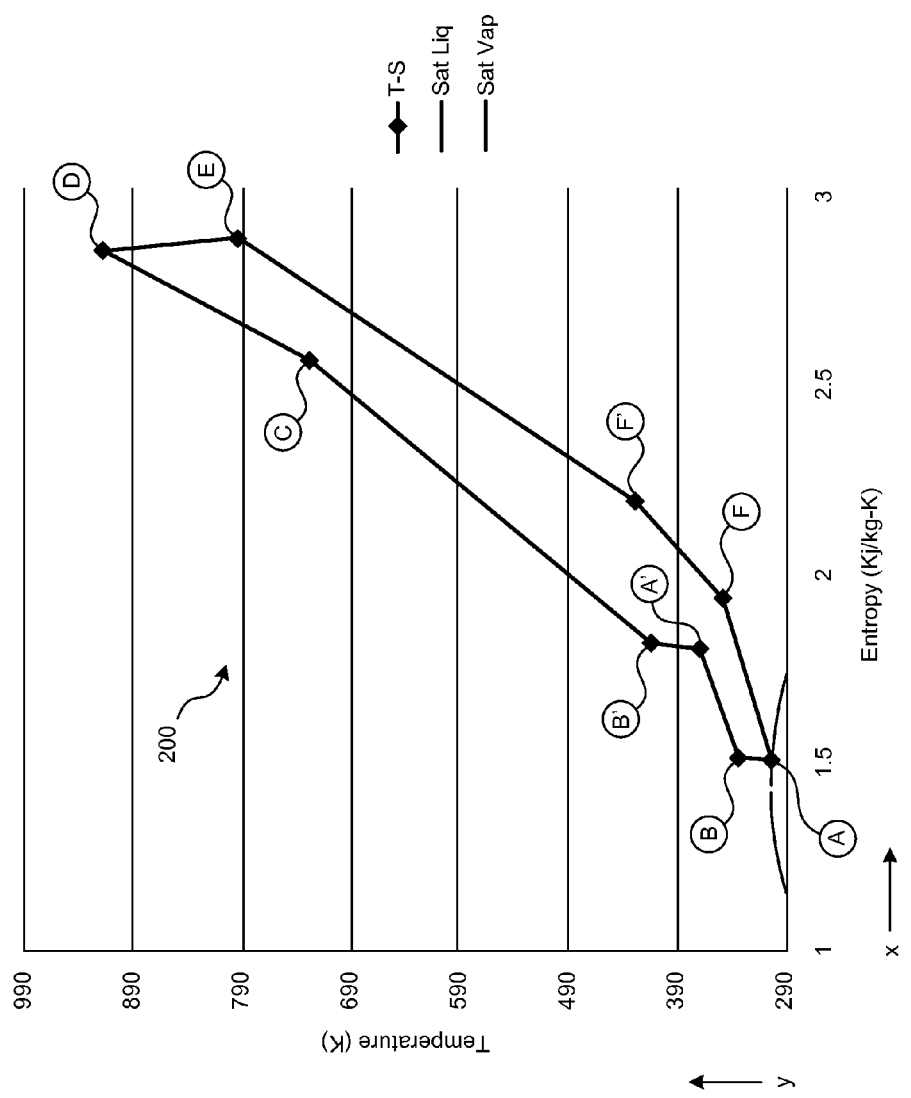
FIG. 2 is a graph of entropy versus temperature for a thermodynamic cycle implemented by the modular power infrastructure network of FIG. 1.

It will be appreciated that, in view of the above, improvement of efficiency of the cycle shown in FIG. 2 over a simple recuperated cycle may, in part, occur because of a greater magnitude of useful heat that is recuperated, a lower average heat sink temperature, and a higher average heat source temperature—in spite of increased power entailed by the compressors 14A and 14B. It will also be appreciated that, in the non-limiting examples set forth above, efficiency improvement due to use of re-heat via recuperation between the compressors 14A and 14B may be on the order of up to about between one-half-to-one percent or so above a simple recuperated power cycle and use of cooling (of the expanded supercritical fluid) may help increase efficiency by about an additional one percent. The heat exchange process heats the supercritical fluid between the compressors 14A, and 14B. This is contrary to typical inter-compressor or compressor interstage heat exchange processes, which cool the working fluid passing from one compressor or compressor stage to the next. Thus, it will be appreciated that a thermodynamic cycle using compressor recuperation may be on the order of about two percent or so more efficient than a thermodynamic cycle using simple recuperation.

It will also be appreciated that for a fixed size heat source (such as the thermal input module 22), there is a larger flow rate (about on the order of about twenty-to-thirty percent or so larger) through the thermodynamic cycle using compressor recuperation (as shown in FIGS. 1 and 2) than in a simple recuperated cycle. Because turbomachinery of power systems using supercritical fluids are compact and powerful, they operate optimally at high speeds (for example without limitation, at speeds around 40,000 revolutions-per-minute ("rpm") or greater for electrical power levels below 5 MW$_e$). However, it will be appreciated that commercial availability may be limited for bearings and seals for systems that entail rotational speeds greater than around 40,000 rpm or so.

In addition, small sizes of wheels (about 3.5-4 inches or so in diameter) for the compressors 14A and 14B may help contribute to increase loss mechanisms in the compressors 14A and 14B. Thus, a larger compressor wheel may have a higher isentropic efficiency than a smaller wheel. A partial solution to this issue may include use of two stages of compression (such as, without limitation, use of the compressors 14A and 14B). Thus, for some applications (such as relatively small applications on the order of around less than around 10 MW$_e$ or so) the physical arrangement of the compressor may already be suited for either inter-cooling (compressors in parallel) or inter-recuperation (compressors in series). As discussed above, inter-recuperation (that is, compressor-recuperation as disclosed in non-limiting embodiments described above) may help increase efficiency more than inter-cooling, thereby helping contribute to setting forth inter-recuperation (that is, compressor-recuperation as disclosed in non-limiting embodiments described above) as a possibly-desired implementation.

In some embodiments, at least one supercritical fluid supply path 30 may be structured to supply supercritical fluid 16 from the supercritical power module 12 and at least one supercritical fluid return path 32 may be structured to return supercritical fluid 16 to the supercritical power module 12. In such embodiments, the supercritical fluid 16 that is supplied from the supercritical power module 12 may be expanded supercritical fluid 16 and/or compressed supercritical fluid 16, as desired for a particular application. The supercritical fluid 16 may be supplied from the supercritical power module 12 via the supercritical fluid supply path 30 to any other suitable module or modules (not shown in FIG. 1) in the modular power infrastructure network as desired for a particular application.

It will be appreciated that any achievable possible efficiency improvements of disclosed embodiments may be made possible because of a possible greater magnitude of useful heat that is recuperated, the lower average heat sink temperature, the higher average heat source temperature in spite of the increased power required by the multiple compressors. It will be appreciated that in these examples the efficiency improvement can be about 2.0 percentage points above the simple recuperated power cycle. In comparison, the use of reheat can increase the efficiency from 0.5 to 1%. Likewise, cooling the expanded supercritical fluid can increase the efficiency by about an additional 1%. Thus, the presently disclosed technology that uses compressor-recuperation can be significantly more effective and/or efficient than commonly used methods of inter-compressor cooling or compressor inter-stage cooling.

It may be desirable to provide supercritical fluid 16 at various temperatures and entropy levels from the supercritical power module 12 to one or more other modules (not shown in FIG. 1) in the modular power infrastructure network as desired for a particular application. Accordingly, in various embodiments, the supercritical fluid supply paths 30 suitably may be provided at locations between one or more of the following components: the outlet 36A of the compressor 14A and the inlet 42A of the recuperator 18; the outlet 44A of the recuperator 18A and the inlet 34B of the compressor 14B; the outlet 36B of the compressor 14B and the inlet 42B of the recuperator 18B; the outlet 44B of the recuperator 18B and the and the isolation valve 21 in the outlet path 20; the isolation valve 25 in the inlet path 24 and the inlet 49 of the expander 26; the outlet 50 of the expander 26 and the inlet 46B of the recuperator 18B; the outlet 48B of the recuperator 18B and the inlet 46A of the recuperator 18A; the outlet 48A of the recuperator 18A and the inlet 52 of the cooler 28; and the outlet 54 of the cooler 28 and the inlet 34A of the compressor 14A. Each supercritical fluid supply path 30 is isolated via a suitable isolation valve 56.

At least one supercritical fluid return path 32 is structured to return supercritical fluid 16 to the supercritical power module 12 from the other module or modules (not shown in FIG. 1) to which the supercritical fluid 16 has been supplied via the supercritical fluid supply path 30. Accordingly, in various embodiments, the supercritical fluid return paths 32 suitably may be provided at locations between one or more of the following components: the outlet 36A of the compressor 14A and the inlet 42A of the recuperator 18; the outlet 44A of the recuperator 18A and the inlet 34B of the compressor 14B; the outlet 36B of the compressor 14B and the inlet 42B of the recuperator 18B; the outlet 44B of the recuperator 18B and the and the isolation valve 21 in the outlet path 20; the isolation valve 25 in the inlet path 24 and the inlet 49 of the expander 26; the outlet 50 of the expander 26 and the inlet 46B of the recuperator 18B; the outlet 48B of the recuperator 18B and the inlet 46A of the recuperator 18A; the outlet 48A of the recuperator 18A and the inlet 52 of the cooler 28; and the outlet 54 of the cooler 28 and the inlet 34A of the compressor 14A. Each supercritical fluid return path 32 is isolated via a suitable isolation valve 58.

The components of the supercritical power module 12 discussed above suitably may be interconnected with piping, tubing, fittings, connectors, and the like appropriate for temperature and pressure conditions and for compatibility with the supercritical fluid 16 contained therein and flowing therethrough. In addition in some embodiments, if desired, connections between components of the supercritical power module 12 may be made with "quick disconnect"-type fittings, thereby helping contribute to modularity of the supercritical power module 12. Moreover, in some embodiments, physical arrangement of components of the supercritical power module 12 may be standardized. That is, a set amount of space may be allocated for a particular component and a standard mounting pad or the like may be utilized for that particular component regardless of size or rating of the particular component, thereby also helping contribute to modularity of the supercritical power module 12.

In some embodiments, if desired connections between the supercritical power module 12 and other modules, such as those at terminations of the outlet path 20, the inlet path 24, the supercritical fluid supply path 30, and the supercritical fluid return path 32 may be made with "quick disconnect"-type fittings, thereby helping contribute to modularity of the modular power infrastructure network 10.

In some embodiments, the supercritical power module 12 may be implemented in one or more standard containers, such as an ocean-going cargo container or the like, thereby helping contribute to modularity of the modular power infrastructure network 10. Moreover, a standard container may be considered to include any such container shipped via road, truck, train, airlift, or water-going vessel.

Now that the illustrative modular power infrastructure network 10 and its components have been discussed, operation of embodiments of the modular power infrastructure network 10 will be discussed below with reference to FIG. 2.

Referring to FIG. 2, entropy (in Kj/kg-K) is graphed versus temperature (in degrees K) for a thermodynamic cycle with compressor recuperation, such as that implemented by the modular power infrastructure network 10. In the discussion below, phases of the thermodynamic cycle illustrated in FIG. 2 are mapped to corresponding components of the modular power infrastructure network 10 that may implement phases associated therewith. Alphabetic references (indicated in FIG. 1 and FIG. 2) are made to relate to phases of the cycle illustrated in FIG. 2 to associated components illustrated in FIG. 1.

FIG. 2 graphs a curve 200 of entropy (in Kj/kg-K) along an x-axis versus temperature (in degrees K) along a y-axis. It will be appreciated that values for entropy and temperature are given by way of illustration only and not of limitation. It will be further appreciated that values of entropy and temperature may be affected by amounts of supercritical fluid 16 that may or may not be provided to other modules (not shown in FIGS. 1 and 2) in the modular power infrastructure network as desired for a particular purpose.

Referring now to FIGS. 1 and 2, between points A and B the temperature of the supercritical fluid 16 is raised in a nearly substantially isentropic process as pressure of the supercritical fluid 16 is raised in the compressor 14A (approximating the well-known relationship $PV=nRT$). Between points B and A' the temperature and enthalpy of the supercritical fluid 16 are raised between the inlet 42A of the recuperator 18A and the outlet 44A of the recuperator 18A. Between points A' and B' the temperature of the supercritical fluid 16 is raised in a nearly substantially isentropic process as pressure of the supercritical fluid 16 is raised in the compressor 14B (approximating the well-known relationship $PV=nRT$). Between points B' and C the temperature and enthalpy of the supercritical fluid 16 are raised between the inlet 42B of the recuperator 18B and the outlet 44B of the recuperator 18B. Between points C and D the temperature and enthalpy of the supercritical fluid 16 are raised by the heat source, such as the thermal input module 22, between the outlet path 20 and the inlet path 24. Between points D and E the temperature and enthalpy of the supercritical fluid 16 are lowered in a nearly substantially isentropic process as the supercritical fluid 16 is expanded, and the pressure thereof is reduced accordingly, in the expander 26. Between points E and F' the temperature and enthalpy of the supercritical fluid 16 are reduced between the inlet 46B of recuperator 18B and the outlet 48B of the recuperator 18B. Between points F' and F the temperature and enthalphy of the supercritical fluid 16 are reduced between the inlet 46A of recuperator 18A and the outlet 48A of the recuperator 18A. Between points F and A temperature and enthalpy of the supercritical fluid 16 are further reduced by the cooler 28.

It will be appreciated that, as seen in FIG. 2, in some embodiments the supercritical fluid 16 may remain in the supercritical state during all phases of the thermodynamic cycle shown in FIG. 2. However, it will be appreciated that, at one or more points during the process shown along the curve 200 a state other than a supercritical state may exist. Nonetheless, for sake of simplicity, reference is only made to the supercritical fluid 16 as opposed to a fluid having one or more properties other than that of a supercritical fluid. Accordingly, as used herein, "supercritical" fluid refers to a fluid that is in a supercritical state during one or more operational portions of a cycle.

Referring to FIGS. 1 and 2, as discussed above in various embodiments the recuperator 18A transfers heat remaining in expanded (lower pressure) supercritical fluid 16 exiting the recuperator 18B to higher pressure supercritical fluid 16 entering the compressor 14B. Also, the recuperator 18B transfers heat from the expanded supercritical fluid 16 to the supercritical fluid 16 exiting the compressor 14B. Thus, temperature of the expanded supercritical fluid 16 that exits the recuperator 18B is lowered (relative to simple recuperation) and temperature of compressed supercritical fluid 16 that enters the recuperator 18B is raised. Relative to simple recuperation, these illustrative embodiments may help result in a lower average heat rejection temperature and greater amounts of recuperated heat, which can help increase the average heat addition temperature compared to a simple recuperated power cycle.

A control system (not shown in FIG. 1) suitably is provided in operative communication with components of the modular power infrastructure network 10 to monitor various parameters and provide feedback to control operation of the modular power infrastructure network 10. The control system may suitably monitor at least temperature, pressure, and flow rate at selected locations within the modular power infrastructure network 10 that correspond to the points A, B, A', B', C, D, E, F', and F (FIGS. 1 and 2). In some embodiments the control system also may suitably monitor speed of the shaft 38 and/or electrical load of the electrical generator 27. In some embodiments the control system may monitor heat flux in the thermal input module 22. The control system suitably compares monitored conditions to desired parameters, generates appropriate control signals, and controls the components of the modular power infrastructure network 10 to vary speed of the shaft 38, ratio compression ratio of the compressors 14A and/or 14B, amount of heat added by the thermal input module 22, and/or the like. The control system suitably may be implemented with any suitable controller, such as without limitation any suitable logic controller or the like, any suitable sensors (such as thermocouples, pressure sensors, flow rate sensors, rotational speed sensors, voltage sensors, current sensors, electrical power sensors, and/or heat flux sensors) and any suitable control actuators (such as without limitation throttle valves, rheostats, and the like).

Other Modules of Modular Power Infrastructure Networks

Now that illustrative thermodynamic cycles that may be implemented by embodiments of the supercritical power module have been discussed, further modules that may be included in embodiments of modular power infrastructure networks, as desired, will be discussed. As will be appreciated, the other modules may be included in any embodiment of a modular power infrastructure network, as desired. The other modules described below can help configure different embodiments of modular power infrastructure networks to perform various functions, as desired. As will also be appreciated, the ability to reconfigure various embodiments of modular power infrastructure networks via inclusion of other modules as desired can help contribute to modularity of modular power infrastructure networks.

Figure 3:
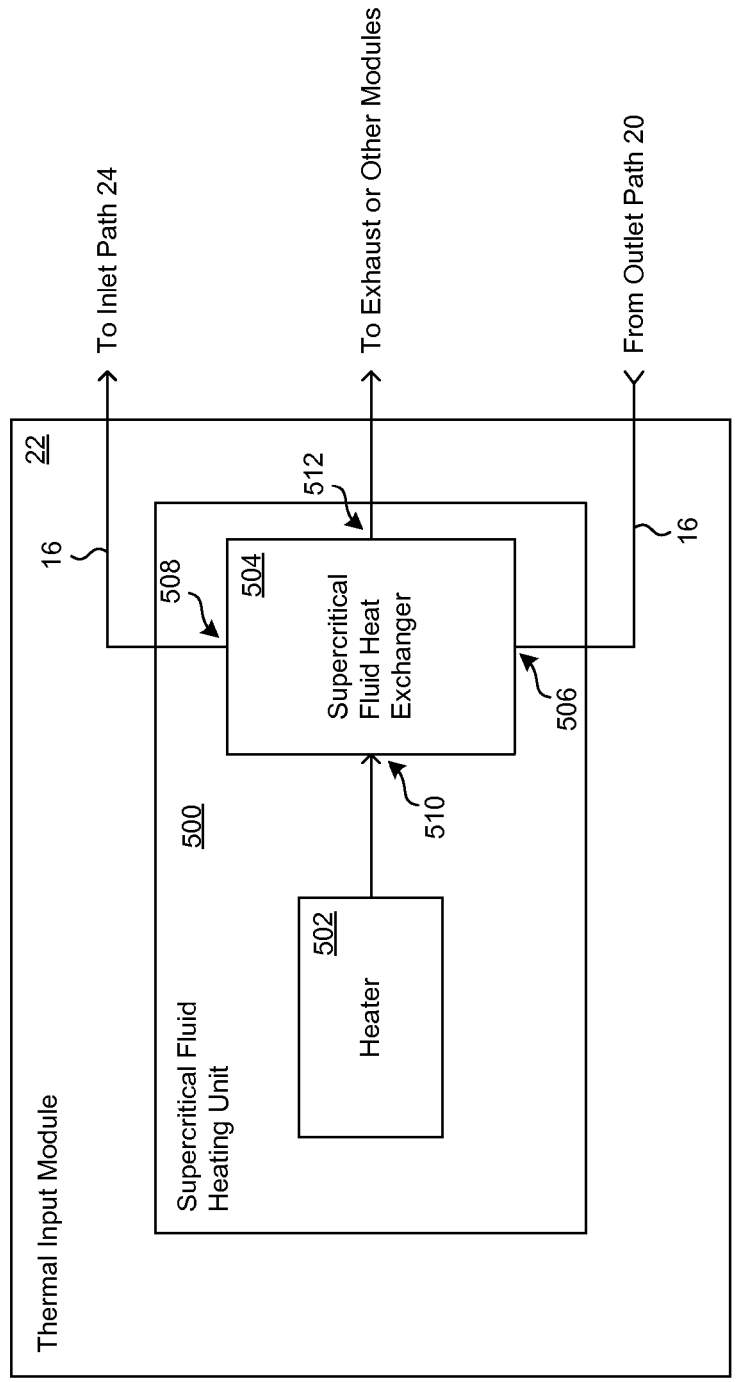
FIG. 3 is a schematic illustration of an illustrative embodiment of a thermal input module.

Referring now to FIGS. 1 and 3, various embodiments of modular power infrastructure networks may include one or more thermal input modules 22. The thermal input module 22 heats supercritical fluid 16 (compressed and supplied by the supercritical power module) and provides the heated supercritical fluid 16 to the supercritical power module.

The thermal input module 22 includes a supercritical fluid heating unit 500. The supercritical fluid heating unit 500 suitably generates or collects heat and transfers the heat to the supercritical fluid 16.

The supercritical fluid heating unit 500 includes a heater 502 and a supercritical fluid heat exchanger 504. The heater 502 generates or collects heat. In some embodiments, the heater 502 may collect (and/or concentrate) heat from other sources of heat, such as without limitation geothermal, solar, process heat, waste heat, or the like. In some other embodiments, the heater 502 may generate heat, such as via oxidation or combustion or the like.

The supercritical fluid heat exchanger 504 is operationally coupled in thermal communication with the heater 502 and transfers the heat from the heater 502 to the supercritical fluid 16. The supercritical fluid heat exchanger 504 suitably is any suitable type of heat exchanger, such as a tube-and-shell heat exchanger, a printed circuit heat exchanger, or the like. The supercritical fluid heat exchanger 504 may be implemented using any suitable flow orientation as desired, such as a cross-flow orientation, a counter-flow orientation, or a parallel-flow orientation. The supercritical fluid heat exchanger 504 suitably is sized to have a selected heat transfer capacity as desired for a particular application.

One side of the supercritical fluid heat exchanger 504 has an inlet 506 that may be coupled in fluid communication to receive supercritical fluid 16 from the outlet path 20 and an outlet 508 that may be coupled in fluid communication to provide heated supercritical fluid 16 to the inlet path 24.

Another side of the supercritical fluid heat exchanger 504 has an inlet 510 coupled to receive heat from the heater 502 and an outlet 512. The outlet 512 can exhaust to ambient or can be coupled to any other suitable module or modules as desired to supply waste thereto.

It will be appreciated that some embodiments of modular power infrastructure networks may include one thermal input module 22 and some other embodiments of modular power infrastructure networks may include more than one thermal input module 22, as desired for a particular application. It will also be appreciated that various embodiments of the thermal input module 22 may include more than one heater 502. In such embodiments, the heaters 502 may be different sources or collectors/concentrators of heat, discussed above, that may be combined with each other. Also, it will be appreciated that various embodiments of the thermal input module 22 may include more than one supercritical fluid heat exchanger 504, as desired for a particular application.

Figure 4:
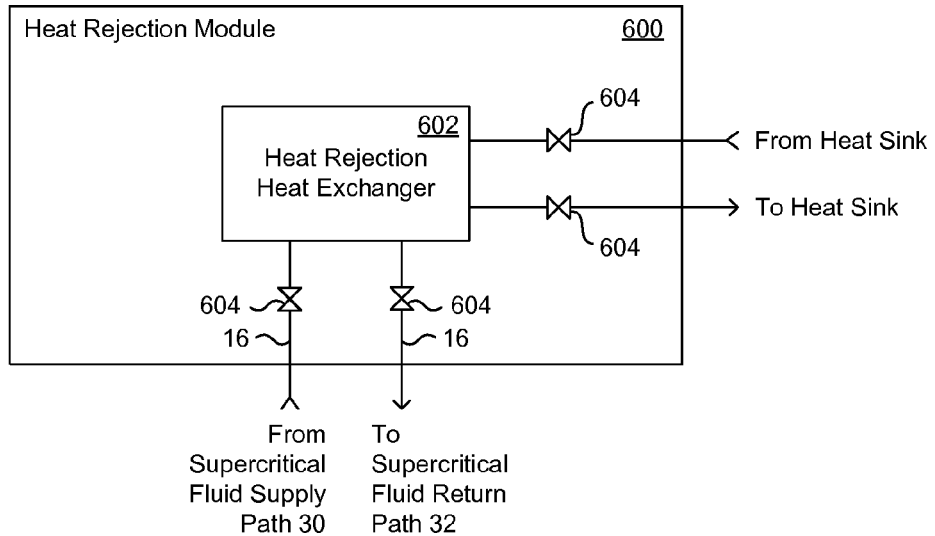
FIG. 4 is a schematic illustration of an illustrative embodiment of a heat rejection module.

Referring now to FIGS. 1 and 4, various embodiments of modular power infrastructure networks may include one or more heat rejection modules 600. In such embodiments, the heat rejection module 600 allows transfer of heat from the supercritical fluid 16 supplied from embodiments of the supercritical power module to a heat sink (not shown) having a bulk temperature below that of the supercritical fluid 16 supplied to the heat rejection module 600. Given by way of non-limiting example, transfer of heat from the supercritical fluid 16 supplied from embodiments of the supercritical power module to the heat sink may be desirable to help increase efficiency of pumping or compression of the supercritical fluid 16. To that end, transfer of heat from the supercritical fluid 16 supplied from embodiments of the supercritical power module to the heat sink reduces enthalpy of the supercritical fluid 16, thereby increasing density of the supercritical fluid 16, which can help increase efficiency of pumping or compression of the supercritical fluid 16.

Embodiments of the heat rejection module 600 include at least one heat rejection heat exchanger 602. The heat rejection heat exchanger 602 may be any suitable type of heat exchanger as desired for a particular application. In some embodiments, it may be desired simply to transfer heat from the supercritical fluid 16 supplied from embodiments of the supercritical power module to the heat sink. In some such cases, the heat sink may be a reservoir like a large body of water (such as a lake, a river, an ocean, or the like) having a bulk temperature below that of the supercritical fluid 16 and the heat rejection heat exchanger 602 may be any acceptable heat exchanger such as a shell-and-tube heat exchanger, a printed circuit heat exchanger, or the like. In other such cases, the heat sink may be ambient air and the heat rejection heat exchanger 602 may be any acceptable heat exchanger structured to provide for evaporative cooling (such as, for example, a heat exchanger configured to spray a liquid onto cooling coils). In other such cases, the heat rejection heat exchanger 602 may be a radiator in which the heat sink is ambient air that is blown past coils through which the supercritical fluid 16 flows.

In some other embodiments, the heat sink may be a reservoir of fluid, having a bulk temperature below that of the supercritical fluid 16, to which it is desired to transfer heat from the supercritical fluid 16 and raise the bulk temperature for a desired purpose. In such cases and given by way of non-limiting examples, embodiments of the supercritical power module may be capable of providing heat otherwise unutilized therein to serve external systems requiring thermal input, such as without limitation district heating, residential heating, commercial heating, industrial heating, structural heating, process heating, or the like.

Each supply and return line to and from both sides of the heat rejection heat exchanger 602 may include an isolation valve 604. In some embodiments, if desired connections between the heat rejection module 600 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the heat rejection heat exchanger 602 may be provided to any other suitable module for heating (and ultimate return to the supercritical fluid return path 32), as desired, instead of being returned directly to the supercritical fluid return path 32.

Figure 5:
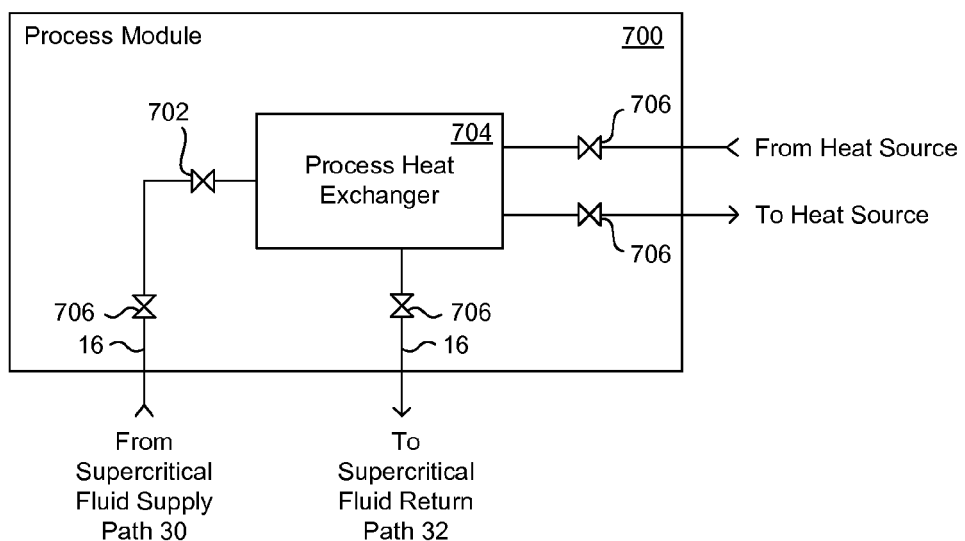
FIG. 5 is a schematic illustration of an illustrative embodiment of a process module.

Referring now to FIGS. 1 and 5, various embodiments of modular power infrastructure networks may include one or more process modules 700. In such embodiments, the process module 700 allows transfer of heat from fluid supplied by a heat source (not shown) to the supercritical fluid 16 supplied from embodiments of the supercritical power module, thereby cooling the fluid supplied by a heat source.

Embodiments of the process module 700 include at least one expansion device 702, such as without limitation an expansion valve or the like, and at least one process heat exchanger 704. The process heat exchanger 704 may be any suitable type of heat exchanger as desired for a particular application, such as a shell-and-tube heat exchanger, a printed circuit heat exchanger, or the like. The expansion device 702 expands the supercritical fluid 16, thereby lowering pressure and causing a drop in enthalpy (and a resultant drop in temperature). In the process heat exchanger 704 heat is transferred from fluid supplied by the heat source (and having a bulk temperature above that of the supercritical fluid 16 that has been expanded by the expansion device 702) to the supercritical fluid 16 that has been expanded by the expansion device 702.

The process module 700 may be used to provide cooling of fluid from any suitable heat source as desired for a particular application, such as without limitation computational facilities, HVAC system, process cooling, building and structure cooling, and the like.

Each supply and return line to and from both sides of the process heat exchanger 704 may include an isolation valve 706. In some embodiments, if desired connections between the process module 700 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the process heat exchanger 704 may be provided to any other suitable module for cooling (and ultimate return to the supercritical fluid return path 32), as desired, instead of being returned directly to the supercritical fluid return path 32.

Figure 6:
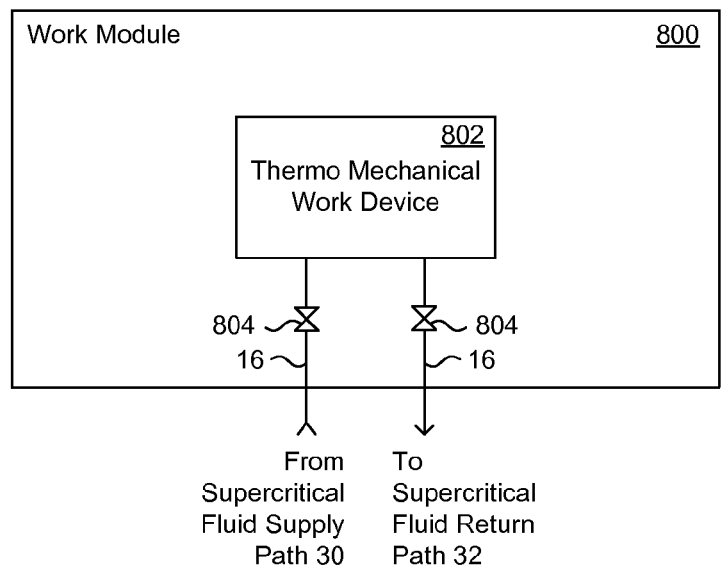
FIG. 6 is a schematic illustration of an illustrative embodiment of a work module.

Referring now to FIGS. 1 and 6, various embodiments of modular power infrastructure networks may include one or more work modules 800. In such embodiments, the work module 800 includes at least one thermo mechanical work device 802 converts energy of the supercritical fluid 16 supplied from embodiments of the supercritical power module to mechanical work or electrical work, as desired for a particular application.

In some embodiments and given by way of non-limiting example, it may be desirable for the work module 800 to provide mechanical work in the form of rotational mechanical energy. In such embodiments, the thermo mechanical work device 802 may include an expander, such as a turbine, that expands the supercritical fluid 16 and converts a drop in enthalpy of the supercritical fluid 16 to rotational mechanical energy. Given by way of example and not of limitation, suitable turbines may include a turbo-expander, an expansion turbine, a centrifugal turbine, an axial flow turbine, and/or the like. Given by way of non-limiting example, in such cases the thermo mechanical work device 802 may rotationally drive a drill bit that is coupled to the thermo mechanical work device 802 (in this case, a turbine) with an appropriate shaft and any suitable gearing, as desired, for applications such as without limitation mining, construction, fossil fuel exploration, fossil fuel extraction, industrial or commercial applications, and the like. Given by way of another non-limiting example, the thermo mechanical work device 802 may rotationally drive an end effector, such as a buffer or the like, for industrial or commercial applications as desired. Regardless of whether rotational mechanical energy provided by the thermo mechanical work device 802 is used to rotationally drive any suitable mechanical work device attached thereto as discussed above, in some embodiments the thermo mechanical work device 802 may rotationally drive one or more suitable electrical power generators, thereby producing electricity as desired.

In some other embodiments and given by way of non-limiting example, it may be desirable for the work module 800 to provide mechanical work in the form of axial mechanical energy. In such embodiments, the thermo mechanical work device 802 may include an expander, such as a reciprocating engine, that expands the supercritical fluid 16 and converts a drop in enthalpy of the supercritical fluid 16 to axial mechanical energy. Given by way of non-limiting example, in such cases the thermo mechanical work device 802 may axially drive a hammer or a pile driver bit that is coupled to the thermo mechanical work device 802 (in this case, a reciprocating engine) with an appropriate, as desired, for applications such as without limitation mining, construction, fossil fuel exploration, fossil extraction, industrial or commercial applications, and the like. Regardless of whether axial mechanical energy provided by the thermo mechanical work device 802 is used to axially drive any suitable mechanical work device attached thereto as discussed above, in some embodiments the thermo mechanical work device 802 may axially drive one or more suitable electrical power generators, thereby producing electricity as desired.

In some embodiments, it may be desirable for the work module 800 to provide mechanical work in the form of rotational mechanical energy and axial mechanical energy. In such embodiments, at least one thermo mechanical work device 802 may include an expander, such as a turbine as discussed above, that expands the supercritical fluid 16 and converts a drop in enthalpy of the supercritical fluid 16 to rotational mechanical energy and an expander, such as a reciprocating engine, that expands the supercritical fluid 16 and converts a drop in enthalpy of the supercritical fluid 16 to axial mechanical energy. Given by way of example and not of limitation, such an illustrative thermo mechanical work device 802 (or thermo mechanical work devices 802) may be used to axially and rotationally drive a combination hammer/drill. Regardless of whether axial and rotational mechanical energy provided by the thermo mechanical work device 802 is used to axially drive any suitable mechanical work device attached thereto as discussed above, in some embodiments the thermo mechanical work device 802 may axially drive one or more suitable electrical power generators and/or may rotationally drive one or more suitable electrical power generators, thereby producing electricity as desired.

Regardless of whether or the work module 800 provides any suitable mechanical work, in various embodiments one or more thermo mechanical work devices 802 may include one or more thermoelectric generators. In such cases, the thermoelectric generator converts heat from the supercritical fluid 16 directly into electrical energy, using a phenomenon called the "Seebeck effect" (or "thermoelectric effect").

Each supply and return line to and from the thermo mechanical work device 802 may include an isolation valve 804. In some embodiments, if desired connections between the work module 800 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the thermo mechanical work device 802 may be provided to any other suitable module for heating, cooling, or conversion to work (and ultimate return to the supercritical fluid return path 32), as desired, instead of being returned directly to the supercritical fluid return path 32.

Figure 7:
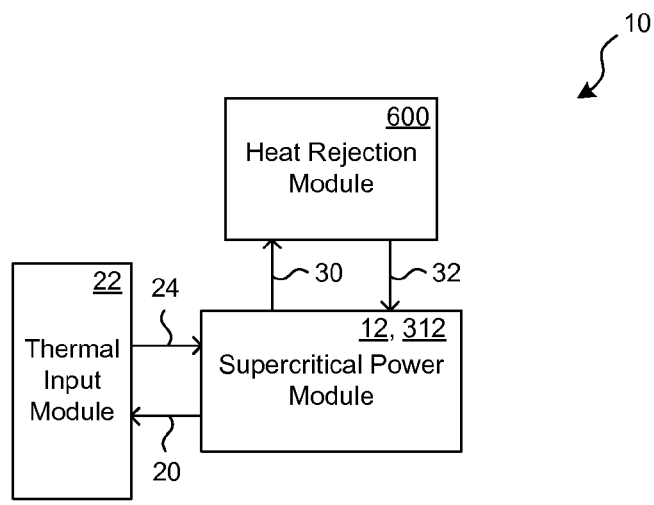
FIGS. 7-13 are schematic illustrations of illustrative embodiments of modular power infrastructure networks.

In various embodiments of modular power infrastructure networks, various modules may be combined as desired for a particular application. To that end, and referring now to FIG. 7, in some embodiments an illustrative modular power infrastructure network 10 may include at least one supercritical power module 12, at least one thermal input module 22 coupled in fluid communication with the at least one supercritical power module 12 via the outlet path 20 and the inlet path 24, and at least one heat rejection module 600 coupled in fluid communication with the at least one supercritical power module 12 via the supercritical fluid supply path 30 and the supercritical fluid return path 32. Such an embodiment may provide combined heating and power ("CHP"), as desired for a particular application.

Figure 8:
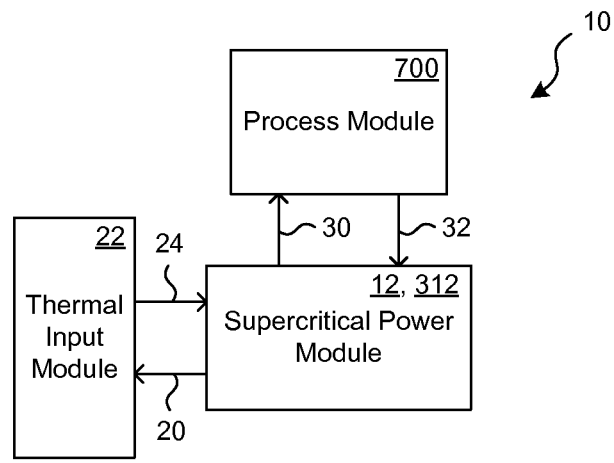

Referring now to FIG. 8, in some embodiments an illustrative modular power infrastructure network 10 may include at least one supercritical power module 12, at least one thermal input module 22 coupled in fluid communication with the at least one supercritical power module 12 via the outlet path 20 and the inlet path 24, and at least one process module 700 coupled in fluid communication with the at least one supercritical power module 12 via the supercritical fluid supply path 30 and the supercritical fluid return path 32. Such an embodiment may provide combined cooling and power ("CCP"), as desired for a particular application.

Figure 9:
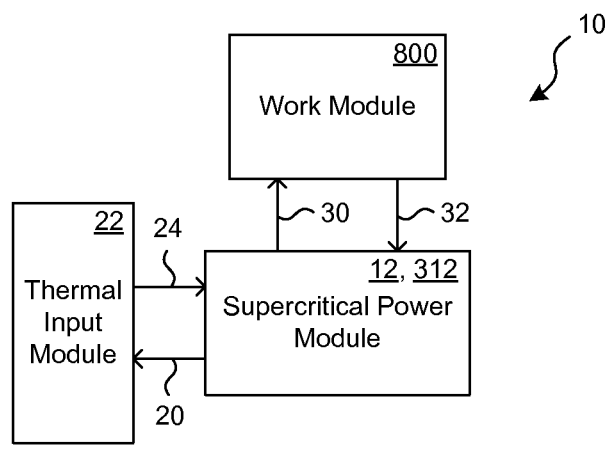

Referring now to FIG. 9, in some embodiments an illustrative modular power infrastructure network 10 may include at least one supercritical power module 12, at least one thermal input module 22 coupled in fluid communication with the at least one supercritical power module 12 via the outlet path 20 and the inlet path 24, and at least one work module 800 coupled in fluid communication with the at least one supercritical power module 12 via the supercritical fluid supply path 30 and the supercritical fluid return path 32.

Figure 10:
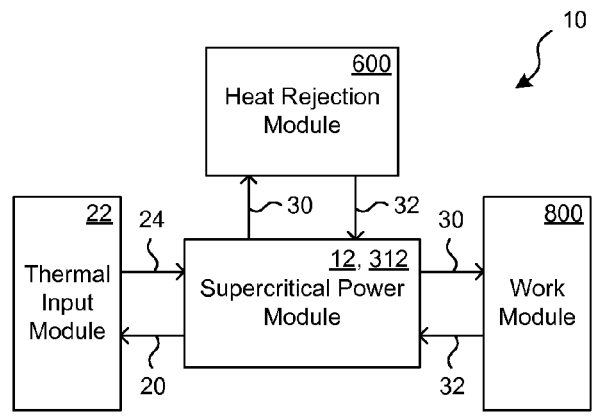

Referring now to FIG. 10, in some embodiments an illustrative modular power infrastructure network 10 may include at least one supercritical power module 12, at least one thermal input module 22 coupled in fluid communication with the at least one supercritical power module 12 via the outlet path 20 and the inlet path 24, at least one heat rejection module 600 coupled in fluid communication with the at least one supercritical power module 12 via the supercritical fluid supply path 30 and the supercritical fluid return path 32, and at least one work module 800 coupled in fluid communication with the at least one supercritical power module 12 via the supercritical fluid supply path 30 and the supercritical fluid return path 32. Such an embodiment may provide CHP, as desired for a particular application.

Figure 11:
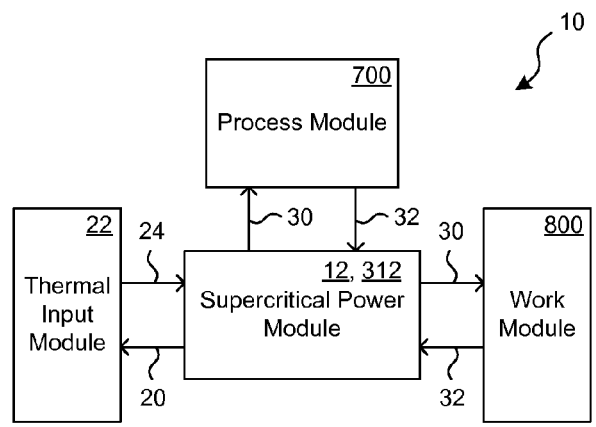

Referring now to FIG. 11, in some embodiments an illustrative modular power infrastructure network 10 may include at least one supercritical power module 12, at least one thermal input module 22 coupled in fluid communication with the at least one supercritical power module 12 via the outlet path 20 and the inlet path 24, at least one process module 700 coupled in fluid communication with the at least one supercritical power module 12 via the supercritical fluid supply path 30 and the supercritical fluid return path 32, and at least one work module 800 coupled in fluid communication with the at least one supercritical power module 12 via the supercritical fluid supply path 30 and the supercritical fluid return path 32. Such an embodiment may provide CCP, as desired for a particular application.

Figure 12:
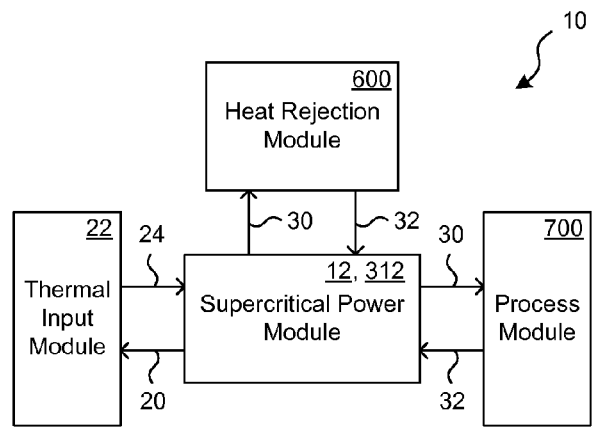

Referring now to FIG. 12, in some embodiments an illustrative modular power infrastructure network 10 may include at least one supercritical power module 12, at least one thermal input module 22 coupled in fluid communication with the at least one supercritical power module 12 via the outlet path 20 and the inlet path 24, at least one heat rejection module 600 coupled in fluid communication with the at least one supercritical power module 12 via the supercritical fluid supply path 30 and the supercritical fluid return path 32, and at least one process module 700 coupled in fluid communication with the at least one supercritical power module 12 via the supercritical fluid supply path 30 and the supercritical fluid return path 32. Such an embodiment may provide combined heating, cooling, and power ("CHCP"), as desired for a particular application.

Figure 13:
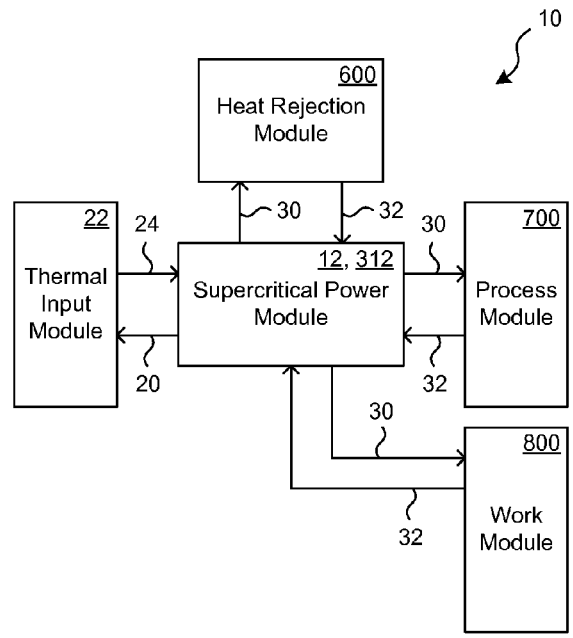

Referring now to FIG. 13, in some embodiments an illustrative modular power infrastructure network 10 may include at least one supercritical power module 12, at least one thermal input module 22 coupled in fluid communication with the at least one supercritical power module 12 via the outlet path 20 and the inlet path 24, at least one heat rejection module 600 coupled in fluid communication with the at least one supercritical power module 12 via the supercritical fluid supply path 30 and the supercritical fluid return path 32, at least one process module 700 coupled in fluid communication with the at least one supercritical power module 12 via the supercritical fluid supply path 30 and the supercritical fluid return path 32, and at least one work module 800 coupled in fluid communication with the at least one supercritical power module 12 via the supercritical fluid supply path 30 and the supercritical fluid return path 32. Such an embodiment may provide CHCP, as desired for a particular application.

Figure 14:
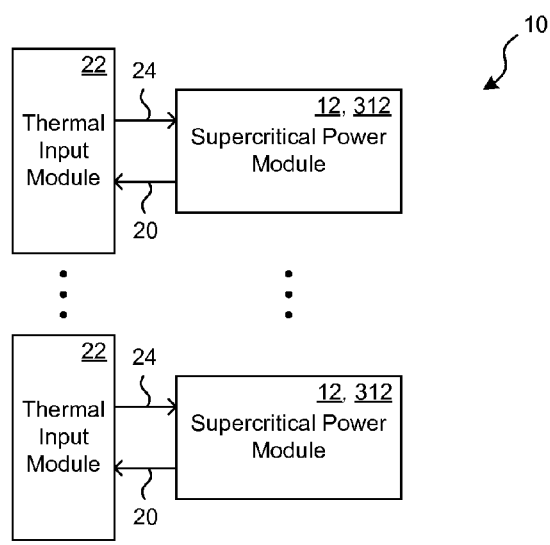
FIGS. 14-16 are schematic illustrations of illustrative embodiments of distributed electrical power infrastructure networks.
Figure 15:
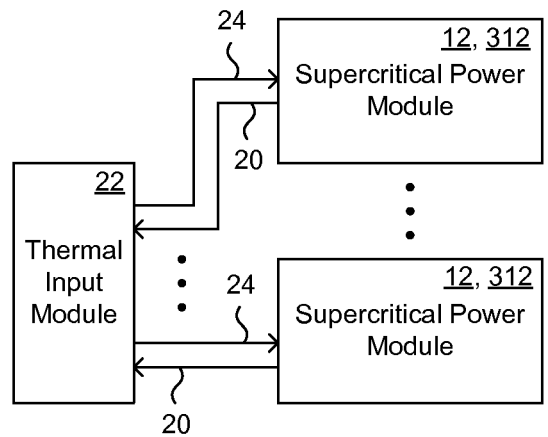
Figure 16:
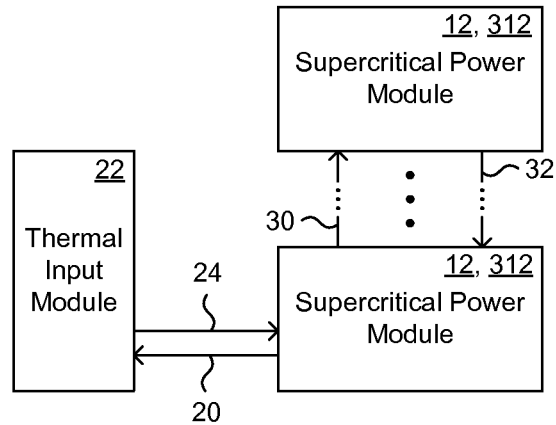

Referring now to FIGS. 14-16, it will be appreciated that embodiments of the modular power infrastructure network 10 may provide for distributed electrical power generation and/or a distributed electrical power grid infrastructure (collectively referred to herein as "distributed electrical power infrastructure networks"). Illustrative distributed electrical power infrastructure networks may include at least one thermal input module 22 and two or more supercritical power modules 10 (regardless of thermodynamic cycle implemented therein) that each include at least one electrical power generator 27 (not shown in FIGS. 14-16). Embodiments of distributed electrical power infrastructure networks may generate and distribute electrical power for applications including without limitation grid-scale electrical utilities, local utilities, microgrids, computational facilities and equipment, motors, mines, military bases, remote power, transportation equipment, batteries, flywheels, and the like.

It will be appreciated that supercritical fluid may be heated and distributed as desired in various embodiments of distributed electrical power infrastructure networks. As a non-limiting example and as shown in FIG. 14, each thermal input module 22 may be coupled in fluid communication directly with an associated supercritical power module 10 via outlet paths 20 and inlet paths 24. As another non-limiting example and as shown in FIG. 15, one thermal input module 22 may be coupled in fluid communication directly with more than one supercritical power module 10 via outlet paths 20 and inlet paths 24. As another non-limiting example and as shown in FIG. 16, one thermal input module 22 may be coupled in fluid communication directly with one supercritical power module 10 via outlet paths 20 and inlet paths 24, which in turn may be coupled in fluid communication directly with another supercritical power module 10 via the supercritical fluid supply path 30 and the supercritical fluid return path 32. It will also be appreciated that, while not shown in FIGS. 14-16, embodiments of distributed electrical power infrastructure networks may include any one or more heat rejection modules 600, process module 700, and/or work module 800 as desired for a particular application.

Illustrative Methods

Now that illustrative embodiments of modular power infrastructure networks and distributed electrical power infrastructure networks have been discussed, illustrative methods will be discussed by way of non-limiting examples. Embodiments of the methods may be used in association with embodiments of the modular power infrastructure network 10 and distributed electrical power infrastructure networks disclosed above. Details of the modular power infrastructure network 10 and distributed electrical power infrastructure networks disclosed above have been set forth above, are incorporated by this reference, and need not be repeated for an understanding of embodiments of the illustrative methods.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 17A:
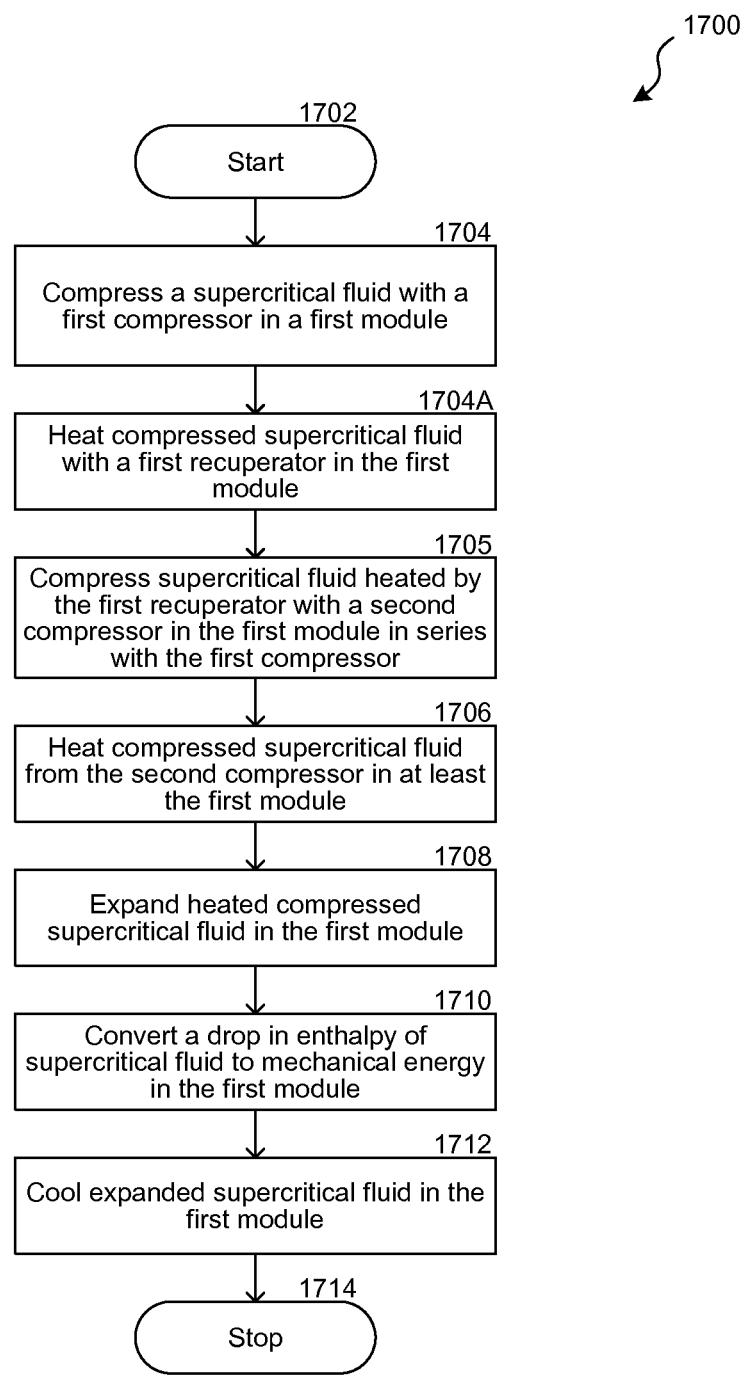
FIG. 17A is a flowchart of an illustrative method of operating a modular power infrastructure network.

Referring now to FIG. 17A, in an embodiment an illustrative method 1700 is provided for operating a modular power infrastructure network. The method 1700 starts at a block 1702. At a block 1704 a supercritical fluid is compressed with a first compressor in a first module. At a block 1704A compressed supercritical fluid is heated with a first recuperator in the first module. At a block 1705 supercritical fluid heated by the first recuperator is compressed with a second compressor in the first module in series with the first compressor. At a block 1706 compressed supercritical fluid from the second compressor is heated in at least the first module. At a block 1708 heated compressed supercritical fluid is expanded in the first module. At a block 1710 a drop in enthalpy of supercritical fluid is converted to mechanical energy in the first module. At a block 1712 expanded supercritical fluid is cooled in the first module. The method 1700 stops at a block 1714.

Figure 17B:
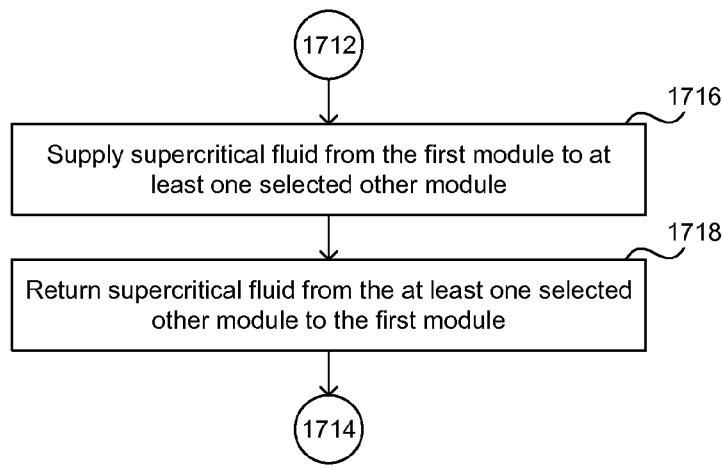
FIGS. 17B-17H illustrate details of the method of the flowchart of FIG. 17A.

Referring additionally to FIG. 17B, in some embodiments supercritical fluid may be supplied from the first module to at least one selected other module at a block 1716 and supercritical fluid may be returned from the at least one selected other module to the first module at a block 1718.

Figure 17C:
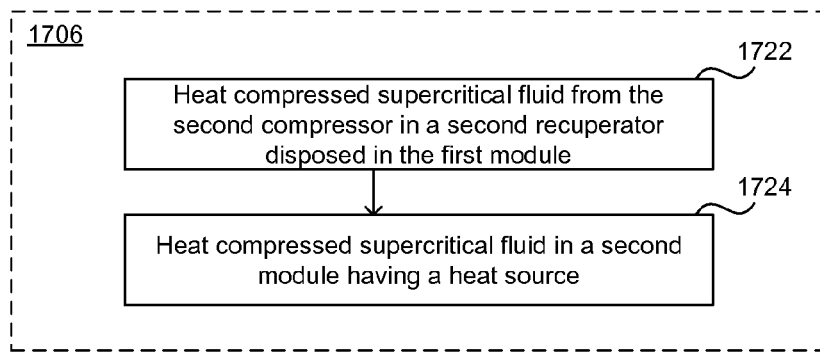

Referring additionally to FIG. 17C, in some embodiments heating compressed supercritical fluid in at least the first module at the block 1706 may include heating compressed supercritical fluid from the second compressor in a second recuperator disposed in the first module at a block 1722, and heating compressed supercritical fluid in a second module having a heat source at a block 1724.

Figure 17D:
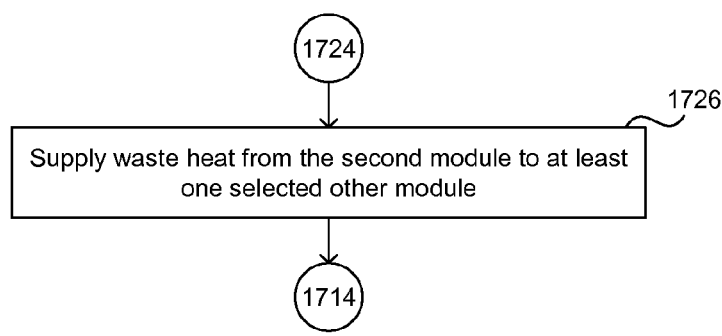

Referring additionally to FIG. 17D, in some embodiments at a block 1726 waste heat may be supplied from the second module to at least one selected other module.

Figure 17E:
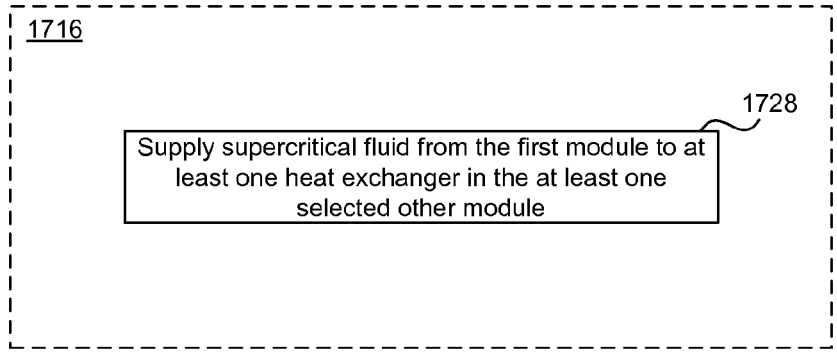

Referring additionally to FIG. 17E, in some embodiments supplying supercritical fluid from the first module to at least one selected other module at the block 1716 may include supplying supercritical fluid from the first module to at least one heat exchanger in the at least one selected other module at a block 1728.

Figure 17F:
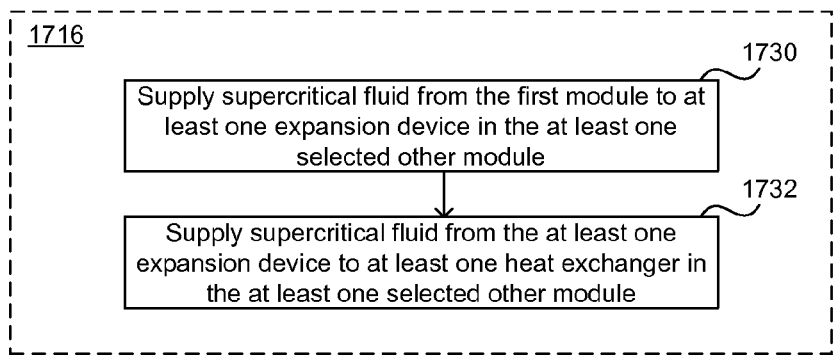

Referring additionally to FIG. 17F, in some embodiments supplying supercritical fluid from the first module to at least one selected other module at the block 1716 may include supplying supercritical fluid from the first module to at least one expansion device in the at least one selected other module at a block 1730 and supplying supercritical fluid from the at least one expansion device to at least one heat exchanger in the at least one selected other module at a block 1732.

Figure 17G:
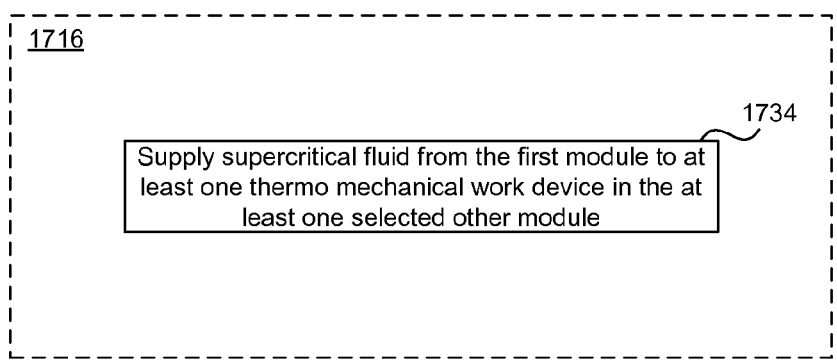

Referring additionally to FIG. 17G, in some embodiments supplying supercritical fluid from the first module to at least one selected other module at the block 1716 may include supplying supercritical fluid from the first module to at least one thermo mechanical work device in the at least one selected other module at a block 1734.

Figure 17H:
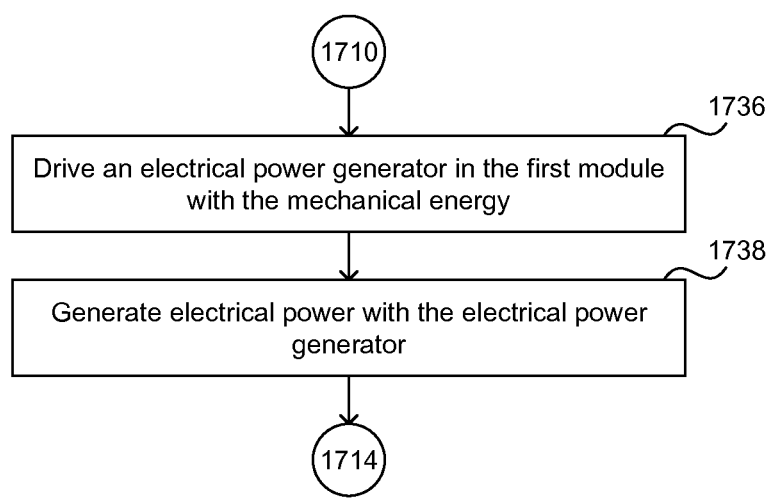

Referring additionally to FIG. 17H, in some embodiments at a block 1736 an electrical power generator in the first module may be driven with the mechanical energy and at a block 1738 electrical power may be generated with the electrical power generator.

Figure 18:
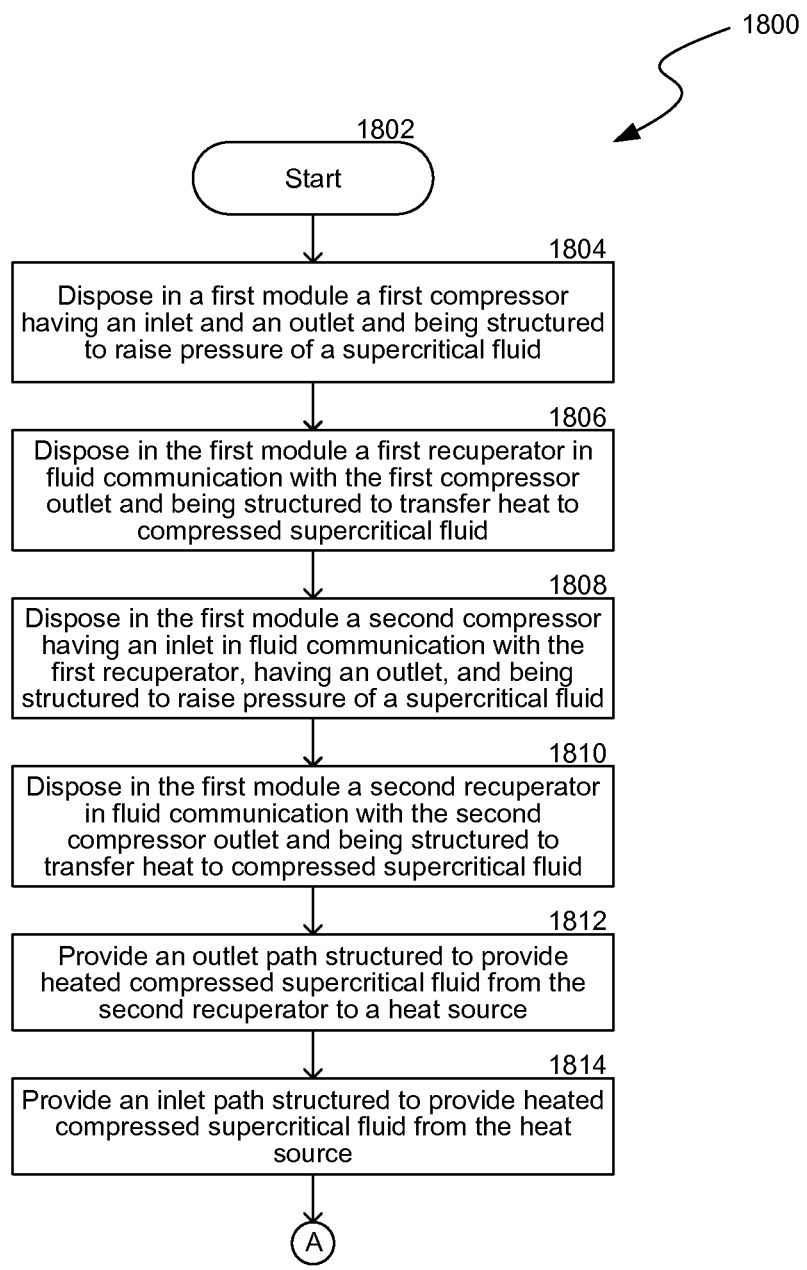
FIG. 18 is a flowchart of an illustrative method of fabricating a modular power infrastructure network.

Referring now to FIG. 18, in an embodiment an illustrative method 1800 of fabricating a modular power infrastructure network is provided. The method 1800 starts at a block 1802. At a block 1804 a first compressor having an inlet and an outlet and being structured to raise pressure of a supercritical fluid is disposed in a first module. At a block 1806 a first recuperator in fluid communication with the first compressor outlet and being structured to transfer heat to compressed supercritical fluid is disposed in the first module. At a block 1808 a second compressor having an inlet in fluid communication with the first recuperator, having an outlet, and being structured to raise pressure of a supercritical fluid is disposed in the first module. At a block 1810 a second recuperator in fluid communication with the second compressor outlet and being structured to transfer heat to compressed supercritical fluid is disposed in the first module. At a block 1812 an outlet path structured to provide heated compressed supercritical fluid from the second recuperator to a heat source is provided. At a block 1814 an inlet path structured to provide heated compressed supercritical fluid from the heat source is provided.

Figure 18A:
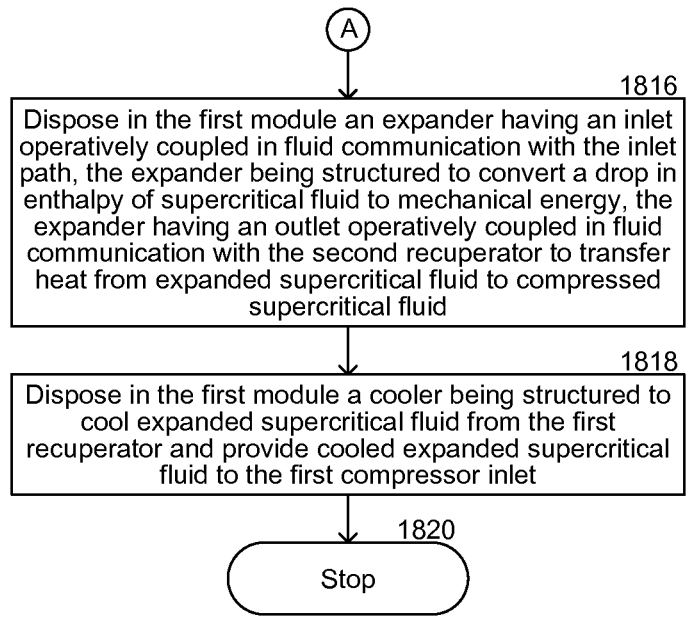
FIG. 18A is a continuation of the illustrative method shown in FIG. 18.

As shown in FIG. 18A, at a block 1816 an expander having an inlet operatively coupled in fluid communication with the inlet path is disposed in the first module, the expander being structured to convert a drop in enthalpy of supercritical fluid to mechanical energy, the expander having an outlet operatively coupled in fluid communication with the second recuperator to transfer heat from expanded supercritical fluid to compressed supercritical fluid. At a block 1818 a cooler being structured to cool expanded supercritical fluid from the first recuperator and provide cooled expanded supercritical fluid to the first compressor inlet is disposed in the first module. The method 1800 stops at a block 1820.

Figure 18B:
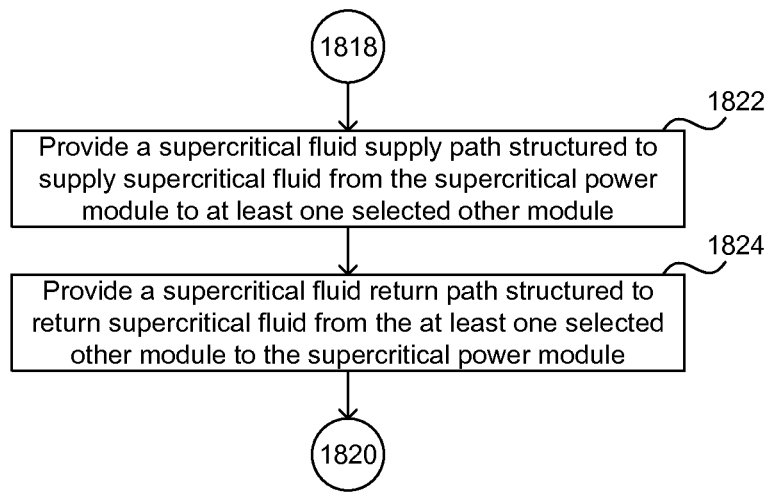
FIGS. 18B-18H illustrate details of the method of the flowchart of FIG. 18A.

Referring now to FIG. 18B, in some embodiments a supercritical fluid supply path structured to supply supercritical fluid from the supercritical power module to at least one selected other module may be provided at a block 1822, and a supercritical fluid return path structured to return supercritical fluid from the at least one selected other module to the supercritical power module may be provided at a block 1824.

Figure 18C:
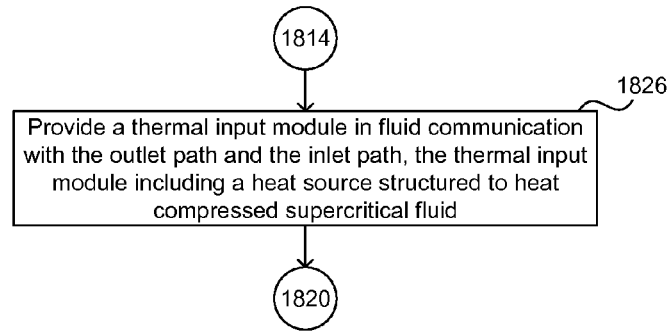

Referring now to FIG. 18C, in some embodiments at a block 1826 a thermal input module in fluid communication with the outlet path and the inlet path may be provided, the thermal input module including a heat source structured to heat compressed supercritical fluid.

Figure 18D:
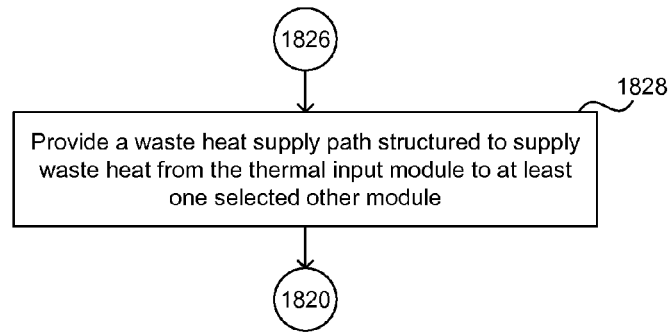

Referring now to FIG. 18D, in some embodiments at a block 1828 a waste heat supply path structured to supply waste heat from the thermal input module to at least one selected other module may be provided.

Figure 18E:
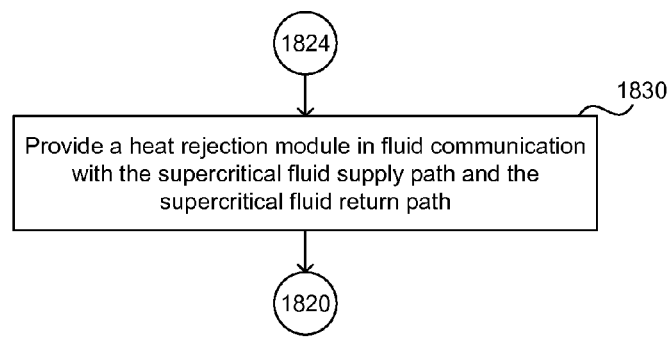

Referring now to FIG. 18E, in some embodiments at a block 1830 a heat rejection module in fluid communication with the supercritical fluid supply path and the supercritical fluid return path may be provided.

Figure 18F:
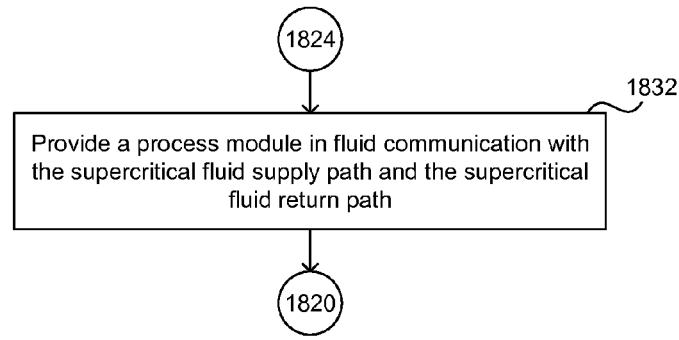

Referring now to FIG. 18F, in some embodiments at a block 1832 a process module in fluid communication with the supercritical fluid supply path and the supercritical fluid return path may be provided.

Figure 18G:
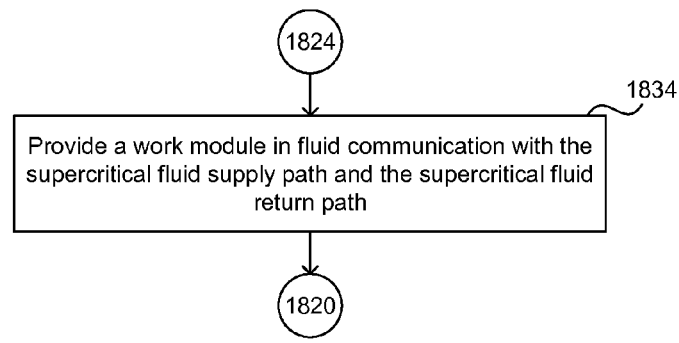

Referring now to FIG. 18G, in some embodiments at a block 1834 a work module in fluid communication with the supercritical fluid supply path and the supercritical fluid return path may be provided.

Figure 18H:
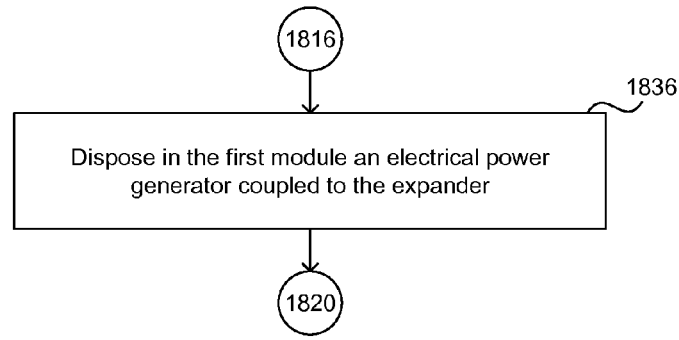

Referring now to FIG. 18H, in some embodiments at a block 1836 an electrical power generator coupled to the expander may be disposed in the first module.

The following U.S. Applications, filed concurrently herewith, are incorporated herein by reference: U.S. patent application Ser. No. 13/843,033, titled "MODULAR POWER INFRASTRUCTURE NETWORK, AND ASSOCIATED SYSTEMS AND METHODS" and U.S. patent application Ser. No. 13/843,668, titled "SYSTEMS AND METHODS FOR PART LOAD CONTROL OF ELECTRICAL POWER GENERATING SYSTEMS".

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary; and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and. C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any suitable order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A modular power infrastructure system comprising:
   a supercritical power module including:
   a first compressor structured to compress a supercritical fluid;
   a first recuperator structured to heat compressed supercritical fluid from the first compressor;
   a second compressor structured to compress heated supercritical fluid received from the first recuperator;
   a second recuperator structured to heat compressed supercritical fluid from the second compressor;
   an outlet path structured to provide heated compressed supercritical fluid from the second recuperator to a heat source;
   an inlet path structured to provide heated compressed supercritical fluid from the heat source;
   an expander coupled to receive heated compressed supercritical fluid from the heat source and structured to convert a drop in enthalpy of supercritical fluid to mechanical energy; and
   a cooler structured to cool expanded supercritical fluid from the first recuperator and provide cooled supercritical fluid to the first compressor.

2. The modular power infrastructure system of claim 1, further comprising:

a supercritical fluid supply path structured to supply supercritical fluid from the supercritical power module; and
a supercritical fluid return path structured to return supercritical fluid to the supercritical power module.

3. The modular power infrastructure system of claim 1, further comprising a thermal input module in fluid communication with the outlet path and the inlet path, the thermal input module including a heat source structured to heat compressed supercritical fluid.

4. The modular power infrastructure system of claim 3, wherein the thermal input module further includes a waste heat supply path structured to supply waste heat from the thermal input module to at least one selected other module.

5. The modular power infrastructure system of claim 2, further comprising a heat rejection module in fluid communication with the supercritical fluid supply path and the supercritical fluid return path.

6. The modular power infrastructure system of claim 5, wherein the heat rejection module includes a heat exchanger.

7. The modular power infrastructure system of claim 2, further comprising a process module in fluid communication with the supercritical fluid supply path and the supercritical fluid return path.

8. The modular power infrastructure system of claim 7 wherein the process module includes an expansion device and a heat exchanger.

9. The modular power infrastructure system of claim 2, further comprising a work module in fluid communication with the supercritical fluid supply path and the supercritical fluid return path.

10. The modular power infrastructure system of claim 9, wherein the work module includes at least one thermo mechanical work device.

11. The modular power infrastructure system of claim 1, wherein the supercritical power module further includes an electrical power generator coupled to the expander.

12. The modular power infrastructure system of claim 1, wherein the expander includes a device chosen from a reciprocating engine, an axial flow turbine, and a radial flow turbine.

13. A modular power infrastructure system comprising:
a supercritical power module including:
a first compressor having an inlet and an outlet and being structured to raise a pressure of a supercritical fluid;
a first recuperator in fluid communication with the first compressor outlet and being structured to transfer heat to the compressed supercritical fluid;
a second compressor having an inlet in fluid communication with the first recuperator, having an outlet, and being structured to raise the pressure of the supercritical fluid;
a second recuperator in fluid communication with the second compressor outlet and being structured to transfer heat to the compressed supercritical fluid;
an outlet path structured to provide heated compressed supercritical fluid from the second recuperator to a heat source;
an inlet path structured to provide the heated compressed supercritical fluid from the heat source;
an expander having an inlet operatively coupled in fluid communication with the inlet path, the expander being structured to convert a drop in enthalpy of the supercritical fluid to mechanical energy, the expander having an outlet operatively coupled in fluid communication with the second recuperator to transfer heat from expanded supercritical fluid to compressed supercritical fluid; and a cooler being structured to cool expanded supercritical fluid from the first recuperator and provide cooled expanded supercritical fluid to the first compressor inlet.

14. The modular power infrastructure system of claim 13, further comprising:
a supercritical fluid supply path structured to supply supercritical fluid from the supercritical power module to at least one selected other module; and
a supercritical fluid return path structured to return supercritical fluid from the at least one selected other module to the supercritical power module.

15. The modular power infrastructure system of claim 13, further comprising a thermal input module in fluid communication with the outlet path and the inlet path, the thermal input module including a heat source structured to heat compressed supercritical fluid.

16. The modular power infrastructure system of claim 15, wherein the thermal input module further includes a waste heat supply path structured to supply waste heat from the thermal input module to at least one selected other module.

17. The modular power infrastructure system of claim 14, further comprising a heat rejection module in fluid communication with the supercritical fluid supply path and the supercritical fluid return path.

18. The modular power infrastructure system of claim 17, wherein the heat rejection module includes a heat exchanger.

19. The modular power infrastructure system of claim 14, further comprising a process module in fluid communication with the supercritical fluid supply path and the supercritical fluid return path.

20. The modular power infrastructure system of claim 19, wherein the process module includes an expansion device and a heat exchanger.

21. The modular power infrastructure system of claim 14, further comprising a work module in fluid communication with the supercritical fluid supply path and the supercritical fluid return path.

22. The modular power infrastructure system of claim 21, wherein the work module includes at least one thermo mechanical work device.

23. The modular power infrastructure system of claim 14, wherein the supercritical power module further includes an electrical power generator coupled to the expander.

24. The modular power infrastructure system of claim 14, wherein the expander includes a device chosen from a reciprocating engine, an axial flow turbine, and a radial flow turbine.

25. A modular power infrastructure network comprising:
a thermal input module;
a supercritical power module in fluid communication with the thermal input module, the supercritical power module including:
a first compressor structured to compress a supercritical fluid;
a first recuperator structured to heat compressed supercritical fluid from the first compressor;
a second compressor structured to compress heated supercritical fluid received from the first recuperator;
a second recuperator structured to heat compressed supercritical fluid from the second compressor, the thermal input module being coupled to receive compressed supercritical fluid from the second recuperator;
an expander coupled to receive heated compressed supercritical fluid from the thermal input module and structured to convert a drop in enthalpy of supercritical fluid to mechanical energy; and a cooler structured to cool expanded supercritical fluid from the first recuperator and provide cooled supercritical fluid to the first compressor.

26. The modular power infrastructure network of claim 25, wherein the supercritical power module further includes:

a supercritical fluid supply path structured to supply supercritical fluid from the supercritical power module; and a supercritical fluid return path structured to return supercritical fluid to the supercritical power module.

27. The modular power infrastructure network of claim 26, further comprising at least one selected other module in fluid communication with the supercritical fluid supply path and the supercritical fluid return path.

28. The modular power infrastructure network of claim 25, wherein the thermal input module includes a heat source structured to heat compressed supercritical fluid.

29. The modular power infrastructure network of claim 27, wherein the thermal input module further includes a waste heat supply path structured to supply waste heat from the thermal input module to the at least one selected other module.

30. The modular power infrastructure network of claim 27, wherein the at least one selected other module includes a heat rejection module.

31. The modular power infrastructure network of claim 30, wherein the heat rejection module includes a heat exchanger.

32. The modular power infrastructure network of claim 27, wherein the at least one selected other module includes a process module.

33. The modular power infrastructure network of claim 32, wherein the process module includes an expansion device and a heat exchanger.

34. The modular power infrastructure network of claim 27, wherein the at least one selected other module includes a mechanical work module.

35. The modular power infrastructure network of claim 34, wherein the work module includes at least one thermo mechanical work device.

36. The modular power infrastructure network of claim 27, wherein the supercritical power module includes an electrical power generator coupled to the expander.

37. The modular power infrastructure network of claim 27, wherein the expander includes a device chosen from a reciprocating engine, an axial flow turbine, and a radial flow turbine.

* * * * *